United States Patent
Kempf et al.

(10) Patent No.: US 11,657,541 B2
(45) Date of Patent: May 23, 2023

(54) PARENT-CHILD CLUSTER COMPRESSION

(71) Applicant: TEXAS INSTRUMENTS INCORPORATED, Dallas, TX (US)

(72) Inventors: Jeffrey Matthew Kempf, Dallas, TX (US); Jonathan Andrew Lucas, Frisco, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 55 days.

(21) Appl. No.: 17/139,407

(22) Filed: Dec. 31, 2020

(65) Prior Publication Data

US 2022/0044446 A1 Feb. 10, 2022

Related U.S. Application Data

(60) Provisional application No. 63/063,050, filed on Aug. 7, 2020.

(51) Int. Cl.
*G06T 9/00* (2006.01)
*G06T 3/40* (2006.01)

(52) U.S. Cl.
CPC .............. *G06T 9/00* (2013.01); *G06T 3/4007* (2013.01); *G06T 3/4015* (2013.01)

(58) Field of Classification Search
CPC ....... G06T 9/00; G06T 3/4007; G06T 3/4015; H04N 19/98
See application file for complete search history.

(56) References Cited

U.S. PATENT DOCUMENTS

| | | | | |
|---|---|---|---|---|
| 4,965,845 | A * | 10/1990 | Chan | G06T 9/005 382/243 |
| 7,525,552 | B2 * | 4/2009 | Yang | H04N 19/96 345/593 |
| 9,516,197 | B2 * | 12/2016 | Hogan | H04N 1/64 |
| 2017/0142426 | A1 * | 5/2017 | Kempf | H04N 1/644 |
| 2019/0272333 | A1 * | 9/2019 | Siddiqi | G06F 16/2228 |
| 2022/0044446 | A1 * | 2/2022 | Kempf | H04N 19/98 |
| 2022/0189069 | A1 * | 6/2022 | Bedi | G06T 9/001 |

FOREIGN PATENT DOCUMENTS

WO WO-2022032215 A1 * 2/2022 ........... G06T 3/4007

* cited by examiner

*Primary Examiner* — Charles T Shedrick
(74) *Attorney, Agent, or Firm* — Michelle F. Murray; Frank D. Cimino

(57) ABSTRACT

A method to compress an image includes assigning each pixel of the image to a cluster based on a red-green-blue (RGB) location of the pixel. The method also includes updating a centroid of the cluster after each pixel is assigned, based at least in part on the RGB location of the pixel, where the centroid is an RGB location. The method includes replacing each pixel in the image with an RGB value of the centroid of the cluster to which the pixel is assigned. The method also includes instructing a display to display a compressed image where, in the compressed image, each pixel in the image is replaced with the RGB value of the centroid of the cluster to which the pixel is assigned.

20 Claims, 10 Drawing Sheets

| TO/FROM KEY | 2 | 7 | 6 | 5 | 8 | 4 | 3 | 1 |
|---|---|---|---|---|---|---|---|---|
| 2 | N/A | 47 | 0 | 0 | 0 | 2 | 2 | 3 |
| 7 | 47 | N/A | 4 | 6 | 3 | 7 | 67 | 40 |
| 6 | 0 | 4 | N/A | 85 | 12 | 1 | 7 | 5 |
| 5 | 0 | 6 | 85 | N/A | 3 | 5 | 42 | 5 |
| 8 | 0 | 3 | 12 | 3 | N/A | 48 | 1 | 30 |
| 4 | 2 | 7 | 1 | 5 | 48 | N/A | 4 | 37 |
| 3 | 2 | 67 | 7 | 42 | 1 | 4 | N/A | 13 |
| 1 | 3 | 40 | 5 | 5 | 30 | 37 | 13 | N/A |
| TOTAL CONNECTIONS | 54 | 174 | 114 | 146 | 97 | 104 | 136 | 133 |

FIG. 9

| TO/FROM KEY | 2 | 7 | 6 | 5 | 8 | 4 | 3 | 1 |
|---|---|---|---|---|---|---|---|---|
| 2 | N/A | 47 | 0 | 0 | 0 | 2 | 2 | 3 |
| 7 | 47 | N/A | 4 | 6 | 3 | 7 | 67 | 40 |
| 6 | 0 | 4 | N/A | 85 | 12 | 1 | 7 | 5 |
| 5 | 0 | 6 | 85 | N/A | 3 | 5 | 42 | 5 |
| 8 | 0 | 3 | 12 | 3 | N/A | 48 | 1 | 30 |
| 4 | 2 | 7 | 1 | 5 | 48 | N/A | 4 | 37 |
| 3 | 2 | 67 | 7 | 42 | 1 | 4 | N/A | 13 |
| 1 | 3 | 40 | 5 | 5 | 30 | 37 | 13 | N/A |
| TOTAL CONNECTIONS | 54 | 174 | 114 | 146 | 97 | 104 | 136 | 133 |

SORTED LIST: 2 7 3 5 6 8 4 1
CONNECTION STRENGTH: 47 67 42 85 12 48 37

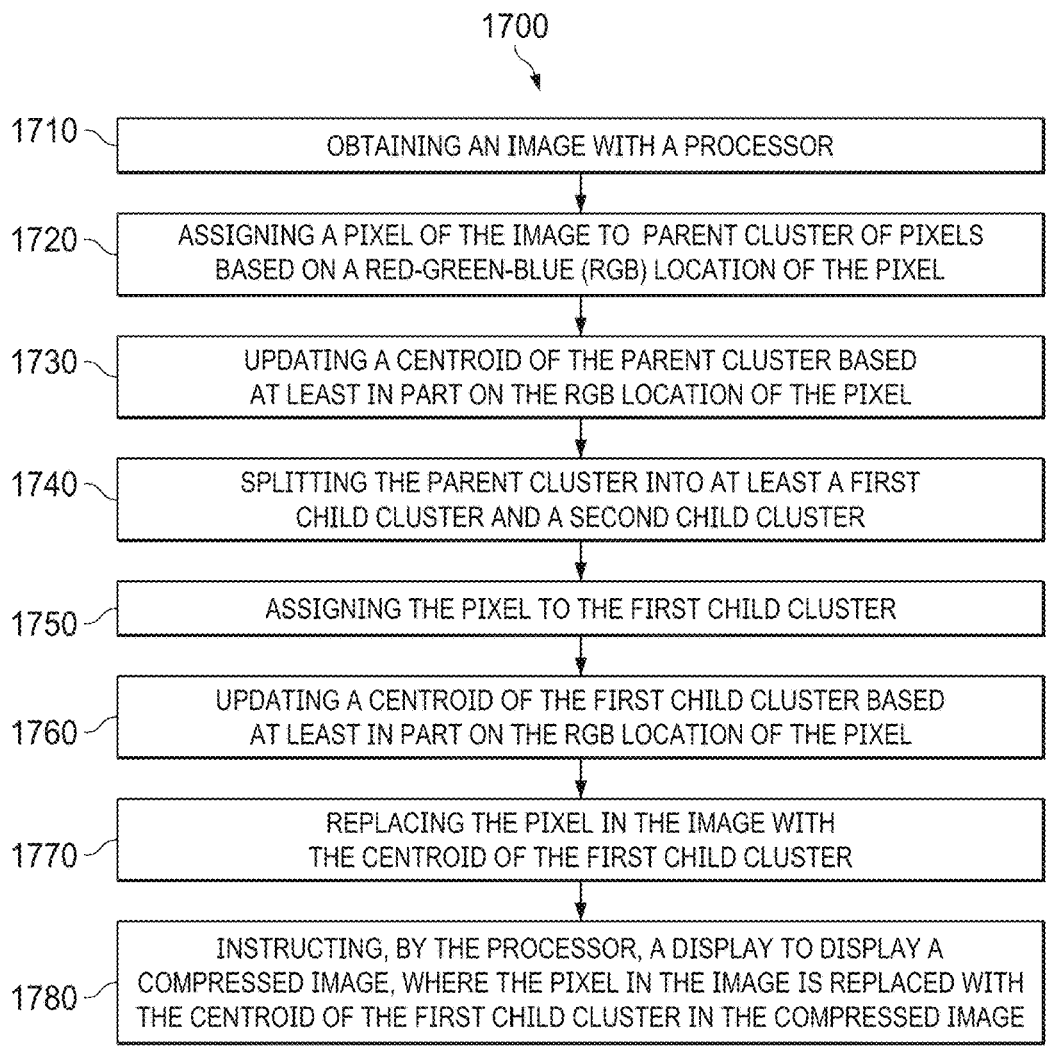

PARENT-CHILD CLUSTER COMPRESSION

CROSS-REFERENCE TO RELATED APPLICATIONS

The present application claims priority to U.S. Provisional Patent Application No. 63/063,050, which was filed Aug. 7, 2020, is titled "Parent-Child Cluster (PCC) Compression With Spatial Entropy Encoding," and is hereby incorporated herein by reference in its entirety.

SUMMARY

In accordance with at least one example of the description, a method includes obtaining an image with a processor. The method includes assigning a pixel of the image to a parent cluster of pixels based on a red-green-blue (RGB) location of the pixel. The method also includes updating a centroid of the parent cluster based at least in part on the RGB location of the pixel. The method includes splitting the parent cluster into at least a first child cluster and a second child cluster, and assigning the pixel to the first child cluster. The method also includes updating a centroid of the first child cluster based at least in part on the RGB location of the pixel. The method includes replacing the pixel in the image with the centroid of the first child cluster. The method also includes instructing, by the processor, a display to display a compressed image, where the pixel in the image is replaced with the centroid of the first child cluster in the compressed image.

In accordance with at least one example of the description, a system includes a processor configured to assign each pixel in an image to a child cluster of child clusters, where each of the child clusters includes a centroid, and where each centroid includes a palette of a first set of palettes. The processor is also configured to interpolate between palettes of the first set of palettes to produce a second set of palettes. The processor is configured to assign each pixel in the image to an assigned palette in the first set of palettes or the second set of palettes. The processor is also configured to replace each pixel in the image with the assigned palette. The system also includes a memory coupled to the processor. The memory is configured to store a key for each pixel in the image, where the key denotes the assigned palette for each pixel in the image.

In accordance with at least one example of the description, a system includes a processor configured to compress an image. Compressing the image includes assigning each pixel of the image to a cluster based on a red-green-blue (RGB) location of the pixel. Compressing the image also includes updating a centroid of the cluster after each pixel is assigned, based at least in part on the RGB location of the pixel, where the centroid is an RGB location. Compressing the image also includes replacing each pixel in the image with an RGB value of the centroid of the cluster to which the pixel is assigned. Compressing the image includes instructing a display to display a compressed image, where in the compressed image each pixel in the image is replaced with the RGB value of the centroid of the cluster to which the pixel is assigned.

BRIEF DESCRIPTION OF THE DRAWINGS

For a detailed description of various examples, reference will now be made to the accompanying drawings in which:

FIG. 9 is a diagram of palettes for each pixel in an image that has undergone parent-child cluster compression in accordance with various examples.

FIG. 16 is a block mitigation weighting algorithm in accordance with various examples.

FIG. 17 is a flowchart of a method for parent-child cluster compression in accordance with various examples.

FIG. 18 is a schematic diagram of a system for parent-child cluster compression in accordance with various examples.

DETAILED DESCRIPTION

Figure 1:
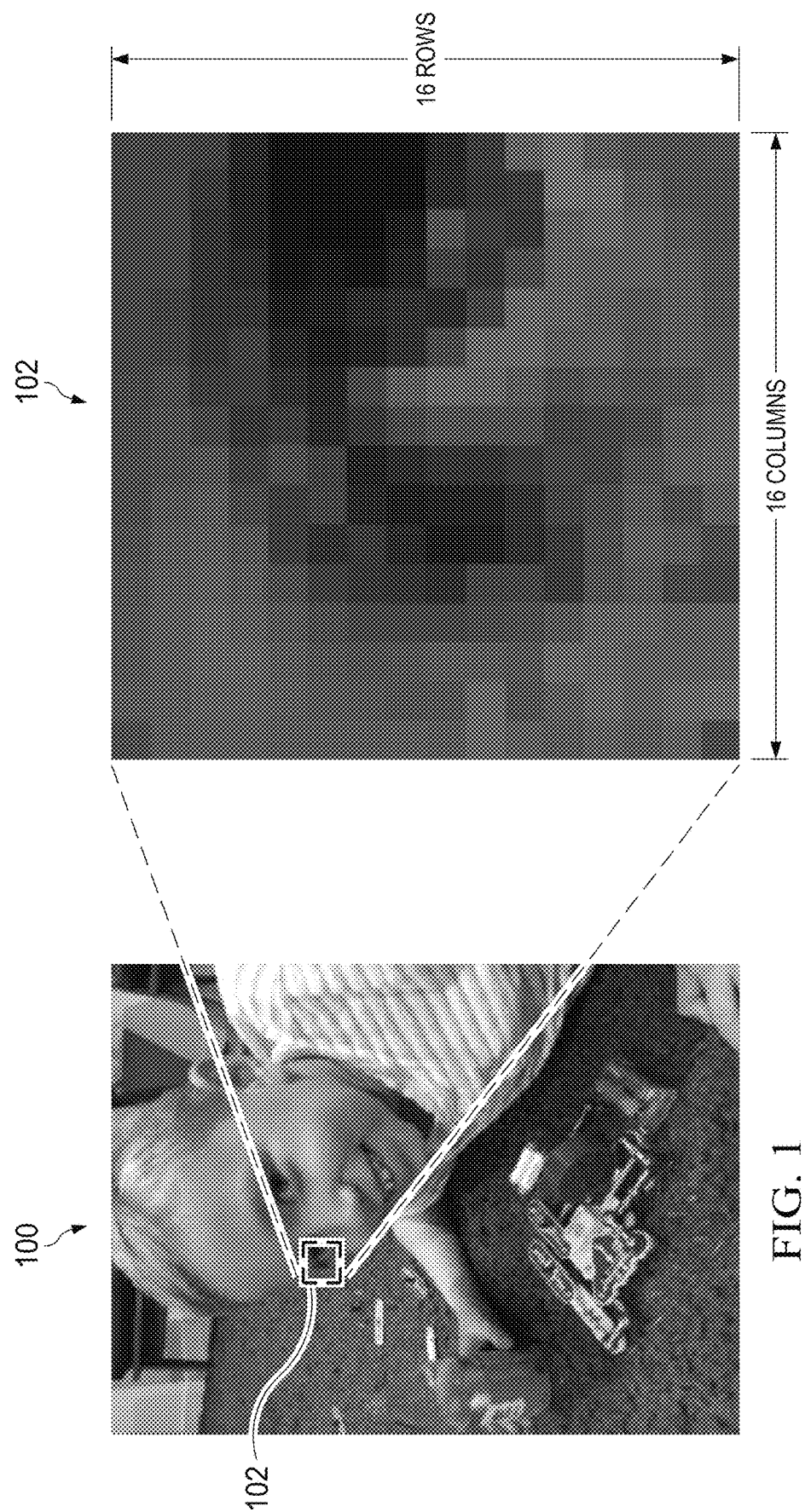
FIG. 1 is an image to be compressed using parent-child cluster compression in accordance with various examples.

Some compression algorithms employ a transform encoding technique, where pixel data is translated into a frequency domain and quantization is performed on frequency coefficients. These algorithms employ a Discrete Cosine Transform (DCT), which is used to represent waveform data as a weighted sum of cosines. These conventional compression techniques impose a relatively high compute load to both compress and decompress data, because they employ translation into and out of the frequency domain.

Parent-child cluster (PCC) compression, as described herein, utilizes a clustering technique to reduce the dimensionality of the data. Because most red-green-blue (RGB) data in a localized region of an image or video is naturally clustered, the PCC technique produces little to no observable loss of information. PCC stays entirely in the spatial domain, so the compute load requirements are much lower than algorithms that use transform encoding techniques, which translates to lower power consumption. Also, decompression of PCC encoded images uses a look-up table (LUT), as a per pixel key is used to determine the appropriate palette or cluster centroid to which a pixel is assigned.

PCC uses multiple aspects to provide compression. PCC employs a parent-child clustering scheme that reduces the quantization error among clustered pixels. Pixels are grouped into clusters based on their location in RGB space. The initial clusters are known as parents. Some or all of these parent clusters are then split into smaller clusters known as children. Also, PCC incorporates a key encoding scheme that is tailored to the human visual system, providing high fidelity in low entropy regions and high dynamic range in high entropy regions.

In the examples described below, PCC takes pixels that make up an original image or part of an original image and maps those pixels in RGB space. Then, PCC groups those pixels into various clusters, based on the pixels' locations in RGB space. After the pixels have been grouped into clusters, the pixels in a given cluster are each represented by a single RGB value, which is located at the centroid of the given cluster. Additional steps are performed during compression and decompression to further improve the results of PCC. PCC produces a compressed version of the image from the original image. The following paragraphs describe PCC with reference to FIGS. 1-17. FIG. 18 is a schematic block diagram of a system, such as a computer system, that may perform PCC as described with reference to FIGS. 1-17.

Examples herein describe a process for compressing data in RGB space to produce a compressed image. However, other suitable types of data can be compressed using the techniques herein. The process described herein compresses a collection of N objects to a number less than N by analyzing an error metric. In these examples, the objects are RGB pixels and the error is a maximum absolute distance (described below), but other objects and other error metrics are useful in other examples.

FIG. 1 is an example image 100 that is compressed to create a compressed image using PCC according to an example herein. Image 100 is a raw image file with 30 bits per pixel. Block 102 is a 16×16 block of pixels that is used to demonstrate the PCC technique herein. Block 102 is a closeup of an eye in image 100 and is composed of 16 rows and 16 columns, or 256 pixels. PCC is a block-based compression algorithm. The block can be any size, and the example described herein will use the 16×16 block 102. While the image in FIG. 1 appears herein as a black and white image, the original image that makes up FIG. 1 is a color image, and it is the color image that is compressed using PCC according to an example herein.

Figure 2:
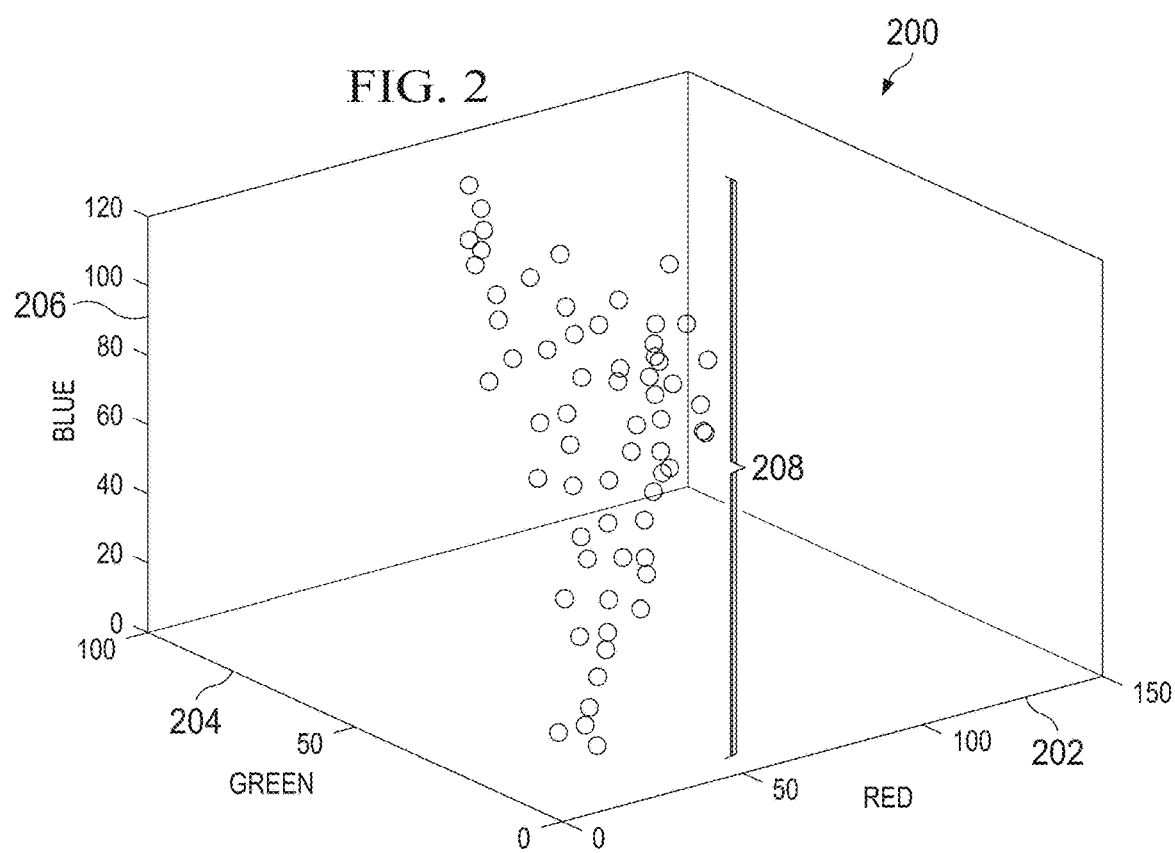
FIG. 2 is a red-green-blue (RGB) value distribution for an image to be compressed in accordance with various examples.

FIG. 2 is a graph 200 of an RGB value distribution for block 102. Each of the 256 pixels in block 102 has an RGB value that denotes the pixel's color, and those 256 values are graphed on the x, y, and z-axes of the three-dimensional RGB space. Axis 202 represents the red value of the pixel. Axis 204 represents the green value of the pixel. Axis 206 represents the blue value of the pixel. Each circle on the graph represents one of the 256 pixels of block 102. For simplicity, only a subset of the 256 pixels is shown in graph 200, rather than all 256 pixels. However, the techniques described herein operate on all 256 pixels in this example. Although not all of the 256 pixels are shown in FIG. 2, pixels 208 represent the collection of the 256 sample pixels of block 102.

Figure 3:
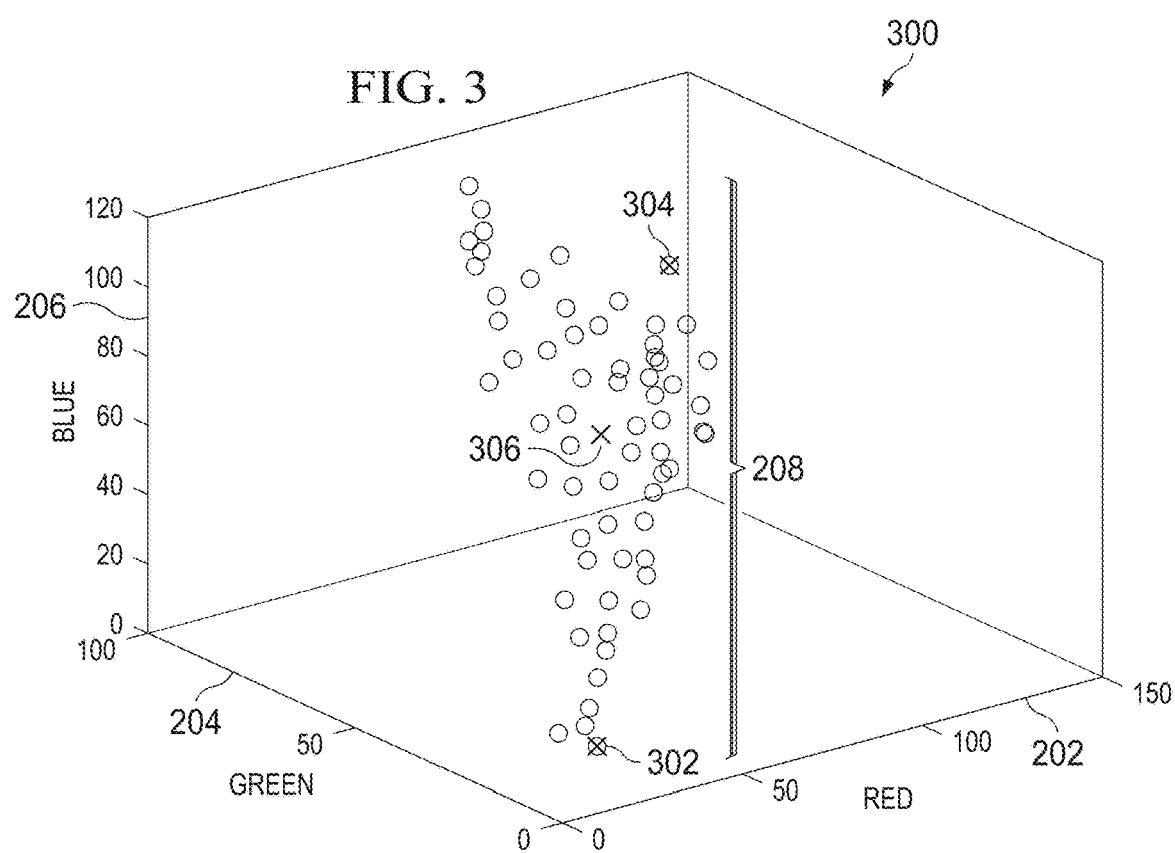
FIG. 3 is a graph of three cluster centroids for parent-child cluster compression in accordance with various examples.

FIG. 3 is a graph 300 of pixels and three cluster centroids selected for parent-child cluster compression. A centroid is a location that marks the average of all of the pixels that make up a cluster. Each centroid has a coordinate in RGB space, just as each pixel does. The PCC algorithm begins with the 256 unique RGB values, which are represented in graphs 200 and 300 as pixels 208. The 256 unique RGB values include one value for each pixel 208 in block 102. To begin the PCC process of compressing the data, the dimensionality of the data is reduced. Reducing the dimensionality will transform the data from a higher-dimensional space to a lower-dimensional space, so the data can be compressed.

The first step in PCC is to determine the dimmest pixel in the data set of pixels 208, the brightest pixel in the data set of pixels 208, and the mean of pixels 208 in the data set, all in RGB space. These three locations are then each used as an initial centroid for one of three clusters or palettes, which in turn are used to characterize each of the 256 pixels in block 102, as described below.

To find the dimmest pixel, luminance information is calculated for each of the 256 pixels of pixels 208. Luminance is determined for each pixel based on the RGB values of the pixel. Any appropriate formula is useful to determine luminance. After the luminance is determined for each pixel, a suitable minimum calculation is performed to select the pixel with the minimum luminance. Likewise, to find the brightest pixel, a suitable maximum calculation is performed to select the pixel with the maximum luminance.

To find the mean of the data set, a recursive mean calculation is used in one example. The RGB values of each of the pixels 208 can be summed, and then the sum is divided by the number of pixels (e.g., 256) to find the mean RGB value of the entire set of pixels 208. In graph 300, the dimmest pixel is the pixel at location 302 in this example. The brightest pixel is the pixel at location 304. Finally, the "X" near the center of graph 300 is the mean of the data set, and is labeled as location 306. In some examples, location 306 may not be located exactly at the location of one of the 256 pixels of pixels 208, because location 306 represents a mean value for the data set. These three locations (302, 304, 306) are called cluster centroids, or palette centroids. These three locations in RGB space are used as the three initial centroids, respectively, for three initial parent clusters of pixels that are used in PCC. In FIG. 3, the pixels 208 have not yet been assigned to one of the three initial parent clusters. The process of assigning pixels to clusters and the result of that assignment are described below with respect to FIG. 5.

Figure 4:
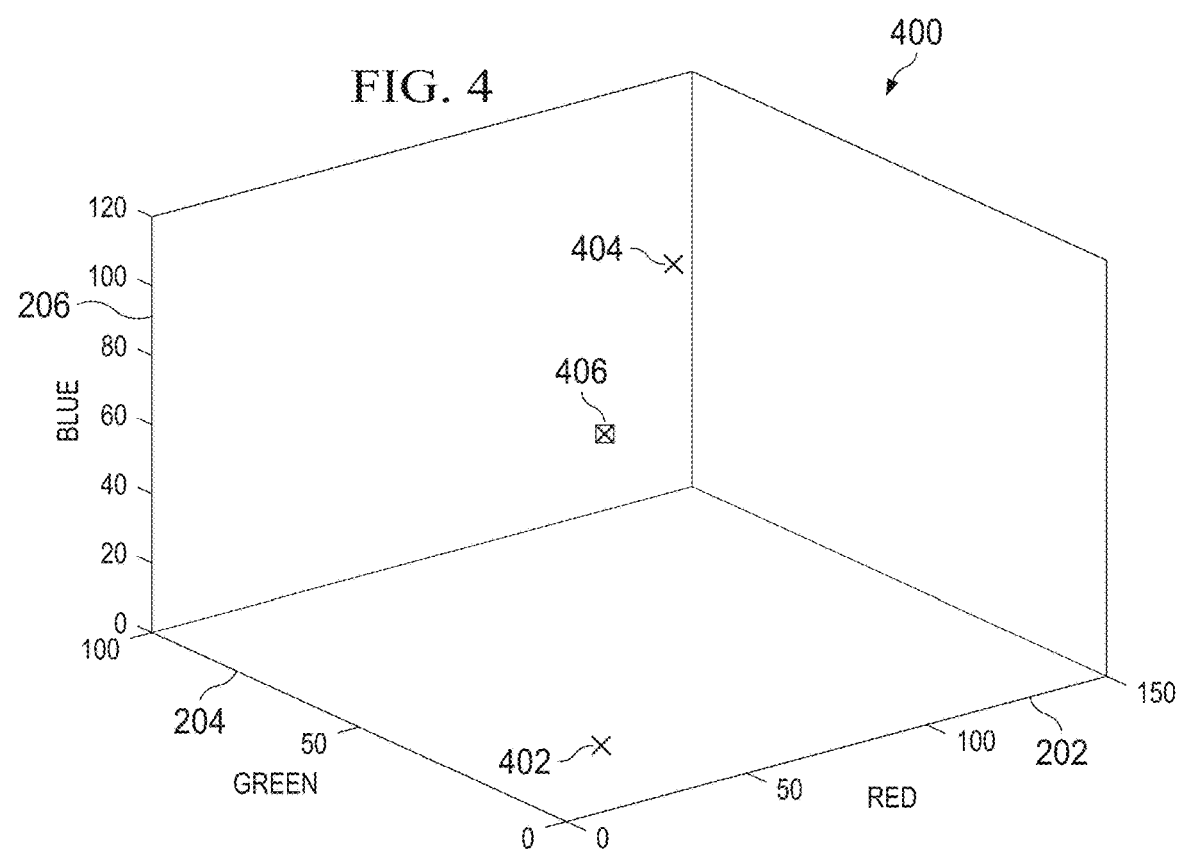
FIG. 4 is a graph of three isolated cluster centroids for parent-child cluster compression in accordance with various examples.

FIG. 4 is a graph 400 of three initial isolated cluster centroids for PCC in RGB space. As described below, these three pixel locations will serve as centroids for three different clusters of pixels, composed of the 256 pixels of pixels 208. Centroid 402 is placed at the location of location 302 from graph 300, which was the location of the dimmest pixel. Centroid 404 is placed at the location of location 304 from graph 300, which was the location of the brightest pixel. Centroid 406 is placed at location 306 from graph 300, which was the location of the mean of the data set of pixels. In the next step described below in FIG. 5, every pixel of the 256 pixels of pixels 208 is assigned to one of three clusters, where the three clusters are based on the three centroids (402, 404, 406).

Figure 5:
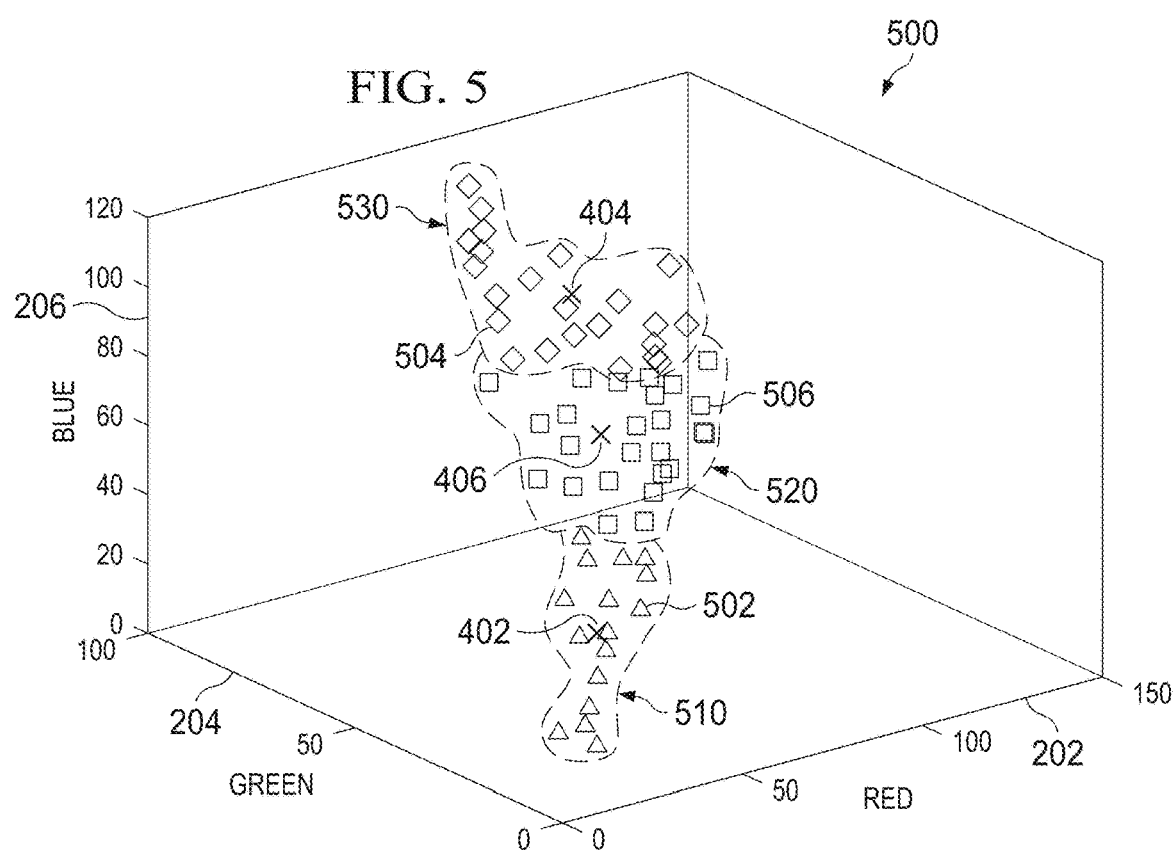
FIG. 5 is a graph of three clusters for parent-child cluster compression in accordance with various examples.

FIG. 5 is a graph 500 of pixels 208 assigned to one of the three clusters associated with centroids 402, 404, and 406. The procedure for assigning each of the pixels to a cluster is known as K-means clustering, and operates as follows. First, for each pixel of the 256 pixels in block 102, the process begins by determining a distance to the nearest cluster (represented by the location of the centroid for the respective cluster). In examples, any suitable type of distance function DIFF can be used. For example, distance can be calculated using summed absolute difference, mean squared error, weighted summed absolute difference, or any other suitable distance functions. One type of distance function is used for the examples herein, but any distance function is useful in other examples. In an example herein, the maximum absolute difference is used as a difference function DIFF. In this example, the nearest cluster is determined by finding the smallest maximum absolute difference between a given pixel and each of the centroids. The difference is represented as DIFF herein. For each pixel 208, the red component, the blue component, and the green component of the pixel in RGB space ($R_{pixel}$, $G_{pixel}$, $B_{pixel}$) are compared to the red, blue, and green components of each centroid in RGB space ($R_{centroid}$, $G_{centroid}$, $B_{centroid}$), respectively. The difference between a pixel in pixels 208 and a given centroid is determined by the following equations (1) to (4).

$$R_{diff}=\text{abs}(R_{centroid}-R_{pixel}) \quad (1)$$

$$G_{diff}=\text{abs}(G_{centroid}-G_{pixel}) \quad (2)$$

$$B_{diff}=\text{abs}(B_{centroid}-B_{pixel}) \quad (3)$$

$$\text{DIFF}=\max(R_{diff}, G_{diff}, B_{diff}) \quad (4)$$

For example, three sample pixels 502, 504, and 506 are shown in FIG. 5. The process begins with pixel 502. Any pixel in pixels 208 can be selected as the starting pixel. Pixel 502 has an RGB value that denotes its location in RGB space. Centroid 402 also has an RGB value that denotes its location in RGB space. The absolute value of the three differences in the red, green, and blue values between pixel 502 and centroid 402 are computed. For instance, using hypothetical numbers in one example, the difference in the red components is 20 ($R_{diff}=20$), the difference in the green components is 26 ($G_{diff}=26$), and the difference in the blue components is 18 ($B_{diff}=18$). These three difference values are used in the DIFF equation, where the maximum value of the set of (20, 26, 18) is selected. That maximum value is 26. That means the maximum absolute difference between pixel 502 and centroid 402 has a value of 26. That value of 26 is stored and will be used again later in the PCC process.

Next, the above calculations are performed twice more to determine the DIFF value for pixel 502 and centroid 406, and to determine the DIFF value for pixel 502 and centroid 404. As seen in graph 500, pixel 502 is farther away from centroids 405 and 404 than from centroid 402. Therefore, these two DIFF values are likely to be higher than 26, which is the DIFF value for pixel 502 and centroid 402. As a hypothetical example, the DIFF value for pixel 502 and centroid 406 is 42, and the DIFF value for pixel 502 and centroid 404 is 55, as determined by the above equations. Three DIFF values have therefore been determined for pixel 502. The minimum of these three DIFF values (26, 42, 55) is 26, which is the DIFF value for pixel 502 and centroid 402. This means that pixel 502 is closest to centroid 402 of the three centroids, and pixel 502 is then assigned to the cluster that corresponds to centroid 402. The cluster that pixel 502 is assigned to is labeled cluster 510. At the beginning of the process, pixel 502 will be the only pixel assigned to cluster 510. As all 256 pixels in block 102 are processed, more pixels will be assigned to cluster 510, and also to the other clusters.

In this example, pixel 502 is the first pixel of the 256 pixels in block 102 that is assigned to a cluster. Before the second pixel is assigned to a cluster (e.g., pixel 504 or pixel 506), the cluster centroid that pixel 502 was assigned to is updated. That is, because pixel 502 has been assigned to cluster 510, the location of centroid 402, which is the centroid of cluster 510, is recalculated. The centroid of cluster 510 is the mathematical center, in RGB space, of all the pixels that have been assigned to cluster 510. As each new pixel is assigned to cluster 510, the location of centroid 402 is updated and will therefore move in RGB space to an updated location. The movement and final location of centroid 402 depends on how many pixels are assigned to cluster 510 and how spread out the pixels are in RGB space. In FIG. 5, the location of centroid 402 is the centroid of cluster 510 after all 256 pixels of block 102 have been assigned to one of the three clusters 510, 520, and 530. Lines are shown around clusters 510, 520, and 530 to denote which pixels belong to each cluster.

After the first pixel, pixel 502, has been assigned to cluster 510 and centroid 402 has been updated, a second pixel from block 102 is selected and assigned to a cluster using the process described above. For example, pixel 504 has been assigned to cluster 530, as it is determined to be closest to centroid 404 after using the above process. Then a third pixel is selected and processed. As another example, pixel 506 has been assigned to cluster 520, as it is found to be closest to centroid 406 after using the above process. Each of the remaining pixels in block 102 is then selected and processed using the above-described techniques and assigned to an appropriate cluster, with the centroids (402, 404, 406) of the clusters being updated after each pixel is assigned. The result of assigning the 256 pixels to clusters 510, 520, and 530 is shown in FIG. 5. Again, for simplicity, not all 256 pixels are shown in FIG. 5. Lines have been drawn around clusters 510, 520, and 530 in FIG. 5 to visually show which pixels belong to which group. The centroids 402, 404, and 406 are also shown in their final updated location.

As each pixel is assigned to a cluster 510, 520, or 530, a running DIFF value is tracked for each cluster. For example, pixel 502 had a minimum DIFF value of 26 as described above, which was used to assign pixel 502 to cluster 510. For each pixel assigned to cluster 510, the sum of the DIFF values for that cluster is computed. The DIFF value of 26 for pixel 502 is added to the DIFF values for all other pixels assigned to cluster 510 and a running total is tracked. Similar running total DIFF values are tracked for clusters 520 and 530. A lower sum of the DIFF values for a cluster indicates a tighter grouping of the pixels that make up that cluster. As a hypothetical example, the DIFF for each cluster are:

Cluster 510 DIFF sum=1992
Cluster 520 DIFF sum=2814
Cluster 530 DIFF sum=3786

The next step in parent-child cluster compression is to split the clusters into parent and child clusters. In one example herein, clusters are split according to the processes described below until eight clusters result. In other examples, clusters may be split until a different number of clusters is created. "Parents" refers to the original clusters 510, 520, and 530. The second level of clusters that are created as a result of the parent being split are called "children." In an example herein, a parent cluster produces two children clusters, but in other examples the parent cluster can produce any number of children clusters.

Figure 6:
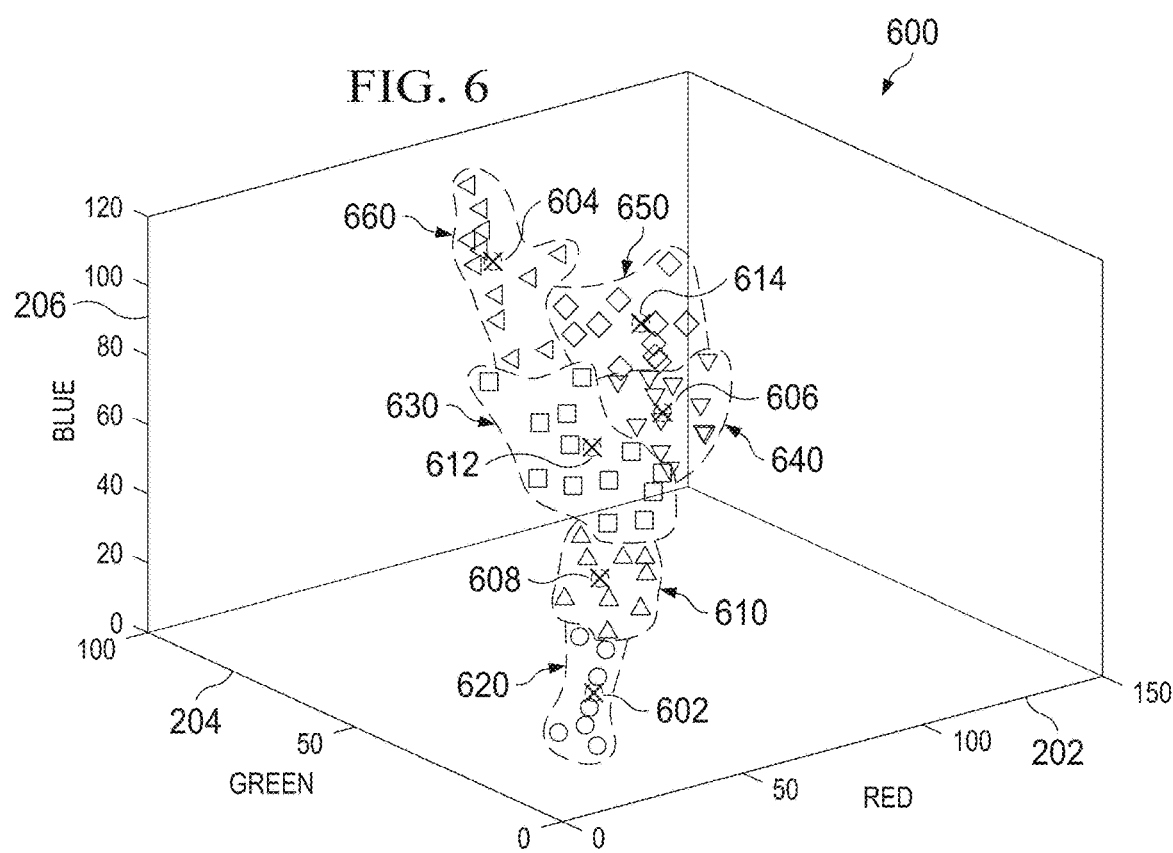
FIG. 6 is a graph of split clusters for parent-child cluster compression in accordance with various examples.

FIG. 6 is a graph 600 of split clusters for parent-child cluster compression in accordance with various examples. Graph 600 shows the child clusters after each parent cluster is split into two child clusters. These child clusters are then analyzed as described below to determine whether each respective child cluster will replace its parent cluster.

In graph 600, cluster 510 from FIG. 5 is subdivided into child clusters 610 and 620. Cluster 520 from FIG. 5 is subdivided into child clusters 630 and 640. Cluster 530 from FIG. 5 is subdivided into child clusters 650 and 660. To subdivide the parent clusters into these child clusters, the pixels are processed one at a time. The pixels can be chosen randomly or processed in any order.

First, a pixel is chosen and then the parent cluster that the pixel is closest to is determined. Then, the next step is determining which child cluster of that parent cluster the pixel is closest to. If this is the first pixel chosen for a given parent cluster, then a first child cluster is initialized with a centroid at the location of the first pixel. For example, if a pixel at location 602 is the first pixel chosen, the pixel at location 602 is closest to centroid 402 of parent cluster 510. A first child cluster of parent cluster 510 (in this case, cluster 620), is initialized with a centroid at location 602.

If a second pixel is chosen and its closest parent cluster is parent cluster 510, the second pixel is processed as follows. First, if the second pixel is in the same location as location 602, the second pixel is assigned to child cluster 620. If the second pixel is in a different location than location 602, a second child cluster is created that has a centroid at the location of the second pixel. For example, a pixel at location 608 is the second pixel chosen for processing. Location 608 is at a different location than location 602, so a second child cluster 610 is created with a centroid at location 608. As new pixels are processed that are closest to parent cluster 510, those new pixels are assigned to either the first child cluster 620 or the second child cluster 610. As those new pixels are assigned to the child clusters, the locations of the centroids of the child clusters are updated as described above. The final locations of the centroids for each of the clusters may not be at a location where a pixel is present. Instead, the centroid is the mathematical center of the pixels that have been assigned to a given cluster.

The other pixels are then processed similarly. The assignment of the pixels to a specific cluster is determined using Equations 1-4 above and the DIFF values, as described with respect to FIG. 5. After each pixel is assigned to a child cluster, the centroid of the cluster that the pixel was assigned to is updated.

The process described above continues for each pixel in block 102. The first time that a pixel is found to be closest to parent cluster 520 in FIG. 5, a first child cluster is created (e.g., cluster 630). As the second pixel closest to parent cluster 520 is processed, that pixel is used to create a second child cluster (e.g., cluster 640), as described above with respect to clusters 610 and 620. Likewise, graph 600 shows that parent cluster 530 has been split into child clusters 650 and 660. In this example, each parent cluster has been split into two child clusters, but in other examples some parent clusters may not be split, or some parent clusters may be split into more than two child clusters.

In the example in FIG. 6, all 256 pixels have been assigned to one of the six child clusters (610, 620, 630, 640, 650, 660). For simplicity, not all 256 pixels are shown. The centroids of the child clusters have also all been updated as pixels are added to the child clusters, and the final location of these six child cluster centroids is shown in FIG. 6 (locations 602, 604, 606, 608, 612, 614). Also, a running DIFF total is kept for each child cluster, just as a running DIFF total was kept for each parent cluster in FIG. 5 above. These running DIFF totals of the children clusters are used to determine how the parent cluster will be split into child clusters. To recap, the hypothetical DIFF totals for the parent clusters above are:

Cluster 510 DIFF sum=1992
Cluster 520 DIFF sum=2814
Cluster 530 DIFF sum=3786

For the children clusters, the hypothetical DIFF sums in this example are:

Cluster 610 DIFF sum=545
Cluster 620 DIFF sum=525
Cluster 630 DIFF sum=673
Cluster 640 DIFF sum=775
Cluster 650 DIFF sum=1999
Cluster 660 DIFF sum=787

The next step in the PCC process is to determine how much a DIFF score can be improved if a parent cluster is split into its respective children clusters. The DIFF score of the parent clusters is an indication of how dispersed the parent cluster is. A goal of the PCC process is to represent the pixels in a given cluster with a single value, in order to provide compression of the pixel data. Representing pixels with a single value that are close to one another provides a better compression result than representing pixels with a single value that are far apart. Therefore, the DIFF scores are used to break up the clusters that are spread out, in order to create smaller clusters that are more compact, which provides better compression results.

The improvement in DIFF scores that can be attained from breaking up a parent cluster is determined by the DIFF scores of the child clusters of that parent. If the child clusters can reduce the DIFF scores compared to the parent cluster, the results of the compression algorithm can be improved by breaking the parent cluster into its respective child clusters. This improvement is indicated by calculating a DIFF improvement score, which is the parent DIFF value minus the summation of its two (or more) child DIFF values. The DIFF improvement score is an indicator of how the overall compactness of the clusters is affected by splitting a cluster. A higher DIFF improvement score is used to determine which cluster to split to most improve the overall compactness of the clusters. This process of assigning pixels to child clusters and then determining if the child clusters should replace the parent clusters can be performed multiple times in some examples, until a target number of clusters is reached.

For example, cluster 530 has a DIFF value of 3786. Subtracting cluster 530's two child cluster DIFF values from 3786 provides a DIFF improvement score of 1000 (3786−1999−787=1000). Cluster 520 has a DIFF value of 2814. Subtracting cluster 520's two child cluster DIFF values from 2814 provides a DIFF improvement score of 1366 (2814−673−775=1366). Cluster 510 has a DIFF value of 1992. Subtracting cluster 510's two child cluster DIFF values from 1992 provides a DIFF improvement score of 922 (1992−525−545=922).

The DIFF improvement scores are then sorted from largest to smallest (e.g., 1366, 1000, 922). The parent clusters are split according to the ordered list of DIFF improvement scores. In this example, splitting cluster 520 yields a DIFF improvement score of 1366, so cluster 520 is split into its two respective child clusters first (clusters 630 and 640).

Clusters will continue to be split in this manner until one of two conditions is met. The first condition is that the number of clusters reaches eight. As noted above, eight clusters are created in this example, but another number of clusters is useful in other examples. The second condition occurs responsive to the maximum DIFF sum among the child clusters being less than the next largest parent DIFF sum. What that means is that a parent cluster was split into two child clusters, and one of the two child clusters has a large DIFF value. If that value is larger than the parent cluster value of the next sorted value in the list, the child cluster should be split further before the next parent cluster is split. A large DIFF value means the child cluster is highly dispersed due to the pixels assigned to it. Therefore, that child cluster is split before the next parent cluster is split.

For example, cluster 520 is split into its two respective child clusters (630 and 640), as noted above. Cluster 520 had a DIFF value of 2814, and it is replaced with children clusters that have DIFF values of 673 and 775. The next cluster in the sorted list of parent DIFF improvement scores is cluster 530, which has a DIFF of 3786 and can be improved by 1000. Cluster 530 is split into its two children clusters, 650 and 660, which have DIFF scores of 1999 and 787, respectively.

At this point, two clusters from FIGS. 5 (520 and 530) have been split, and cluster 510 remains unsplit. For example, before the splitting algorithm was performed, the RGB coordinates of the three centroids are:

Cluster 510, centroid 402: (43,29,27)
Cluster 520, centroid 406: (88,62,55)
Cluster 530, centroid 404: (99,84,79)

After parent clusters 520 and 530 have been split, there are five clusters. Cluster 510 has not been split, so it remains, along with the four new child clusters:

Cluster 510, centroid 402: (43,29,27)
Cluster 630, centroid at location 612: (76,59,55)
Cluster 640, centroid at location 606: (103,65,54)
Cluster 650, centroid at location 614: (113,79,68)
Cluster 660, centroid at location 604: (84,89,90)

Because there are five clusters at this point, additional splitting iterations will continue until eight clusters is reached. The additional splitting iterations involve repeating the process of assigning pixels to parent cluster and child clusters, and then determining DIFF improvement scores to decide if a cluster should be split, as described above. Some splitting iterations may produce more child clusters than other iterations. In this example, the next cluster in the sorted list of parent DIFF improvement scores is cluster 510, which has a DIFF score of 1992 and a cluster improvement score of 922. However, at this point the second condition described above is met. The DIFF score of 1992 for parent cluster 510 is less than the DIFF score for one of the children clusters, cluster 650, which has a DIFF score of 1999. This indicates that the child cluster 650 should be split before the parent cluster 510 is split.

The splitting process continues as described above until eight clusters are created. Child cluster 650 is split, and pixels of child cluster 650 are assigned to the child clusters of cluster 650 using the process described above. Pixels are also assigned to the other existing clusters as described above. The process of splitting clusters, assigning pixels to the clusters, and computing DIFF values continues as set forth above until eight clusters are created. The details of the process to go from five clusters to eight clusters is omitted for simplicity.

Figure 7:
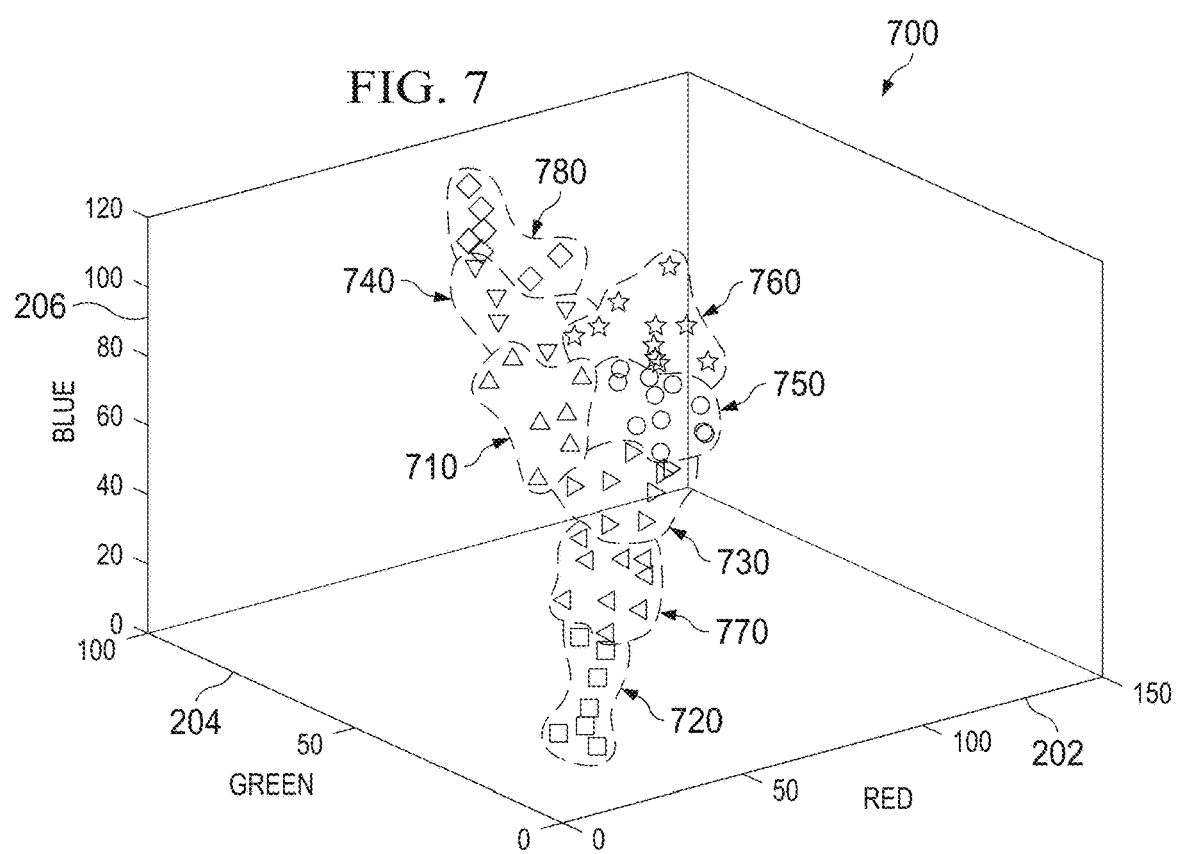
FIG. 7 is a graph of eight split clusters for parent-child cluster compression in accordance with various examples.
Figures 8, 10:
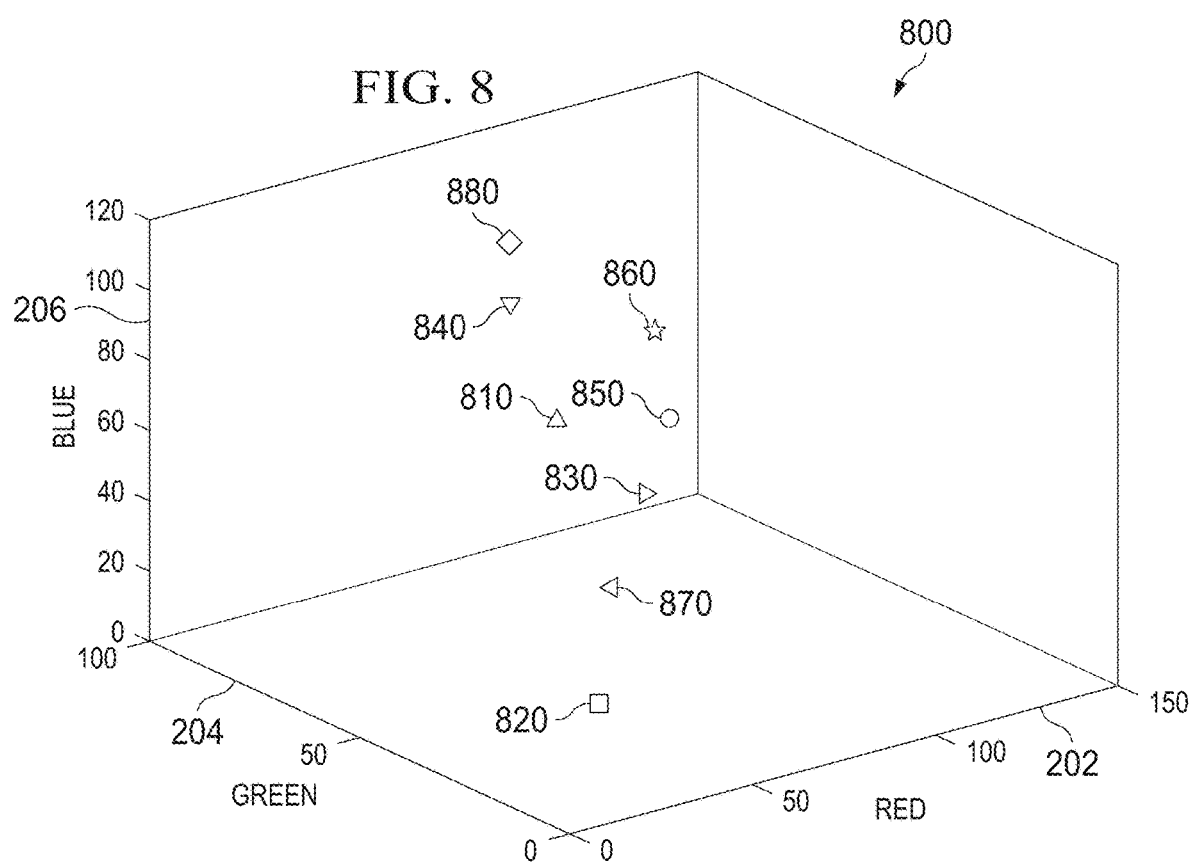
FIG. 8 is a graph of eight palette centroids for parent-child cluster compression in accordance with various examples.
FIG. 10 is a histogram of key transitions in accordance with various examples.

FIG. 7 is a graph 700 of the resulting eight split clusters for PCC according to an example. Each of the 256 pixels of block 102 has been assigned to one of the eight clusters using the technique described above with respect to FIGS. 4-6. For simplicity, not all 256 pixels are shown in graph 700. Lines are shown around the eight split clusters to mark which pixels belong to which cluster. These eight clusters are labeled as clusters 710, 720, 730, 740, 750, 760, 770, and 780. Each cluster has a centroid that is the centroid of all the pixels that are assigned to that cluster. The centroids are not shown in FIG. 7, but are shown in FIG. 8. The pixel values for each of the 256 pixels will be replaced with the centroid of the cluster that each respective pixel has been assigned to. For example, each pixel from block 102 in cluster 710 will be replaced with the RGB value for the centroid of cluster 710. Likewise, each pixel in cluster 720 will be replaced with the centroid of cluster 720, and so on for each of the eight clusters. The PCC algorithm has therefore replaced 256 different pixel values from the pixels in block 102 with just 8 pixel values, with the 8 pixel values determined by the centroids of the clusters. Because the clusters were created by grouping pixels that are close to one another in RGB space, the 8 pixel values that replace the original 256 pixel values will compress the data while also providing an RGB value for each pixel that is close to the original RGB value of the pixel. This RGB value replacement is one of the features of the PCC algorithm that provides improved compression results for a compressed image. After replacing each pixel in block 102 with one of the eight pixel values, a compressed image that includes block 102 can be displayed on a display using one of the eight pixel values for each pixel. In other examples, additional steps are taken as described below before displaying the compressed image on a display.

FIG. 8 is a graph 800 of the centroids of each of the eight clusters from graph 700. The eight cluster centroids are also referred to as palettes. Each of the 256 pixels in block 102 is represented by one of these eight palettes. The eight palettes are palettes 810, 820, 830, 840 850, 860, 870, and 880.

Another aspect of PCC is that the technique can provide better low entropy performance in some examples. If an image such as the image in block 102 is compressed to only eight palettes, the image becomes more quantized. That is, some of the subtle gradations from pixel to pixel are removed from the image due to the compression. The areas where subtle gradations occur are referred to as low entropy areas.

If the image has a shallow gradient (such as a shadow that should appear smooth, without a harsh boundary), PCC can provide higher compressed image quality in those areas. Higher image quality is achieved by noting how often transitions occur between one palette value and another palette value in those area. To track these transitions, a spatial histogram is used.

Figure 9:
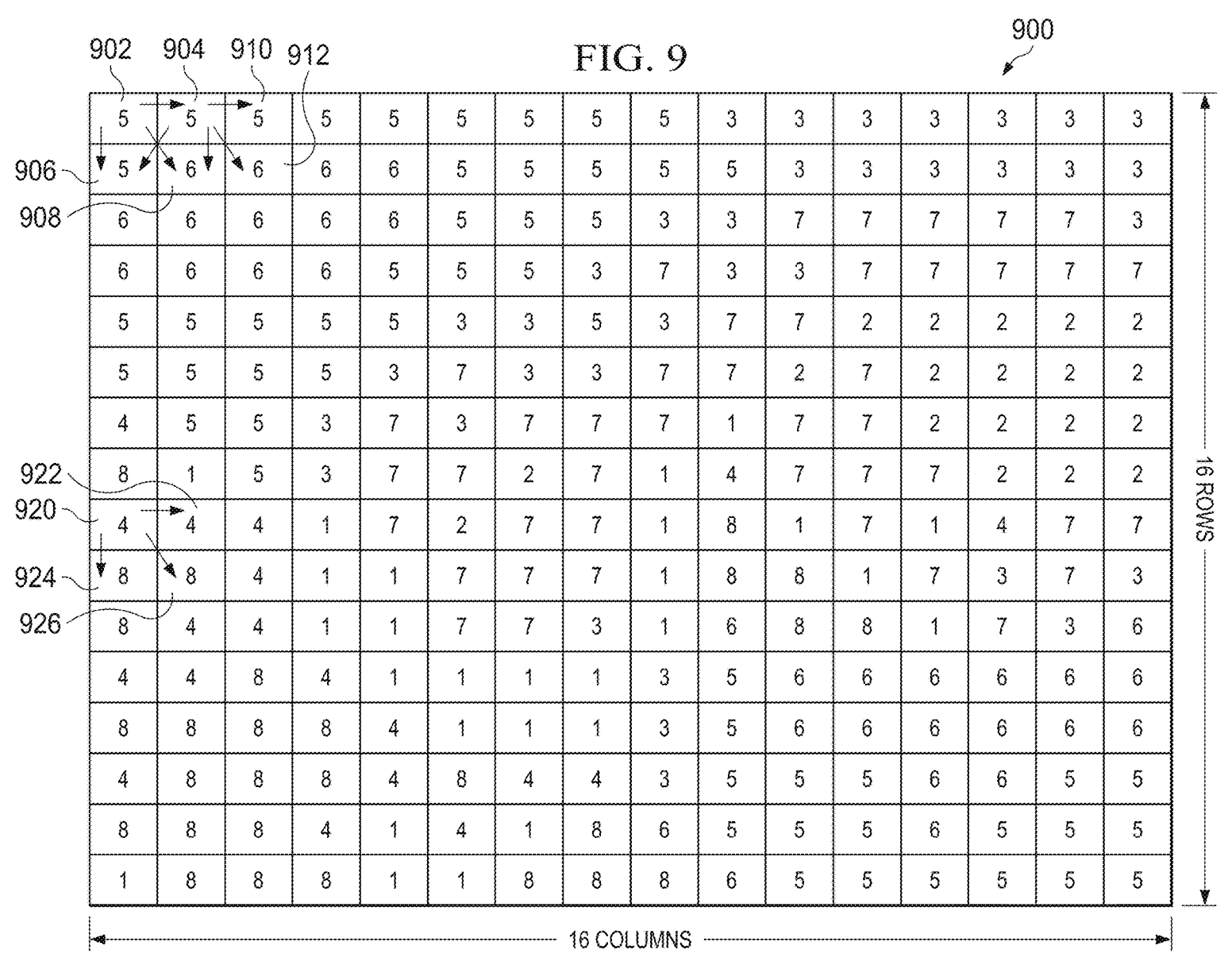

FIG. 9 is a diagram 900 of the palettes for each pixel in the 16×16 image in block 102. In diagram 900, each pixel of block 102 has been replaced with a key that indicates which palette the pixel belongs to. For example, pixels in cluster 710 in FIG. 7 are replaced by palette 810 from FIG. 8, and those pixels are labeled with the key "1" in FIG. 9. Likewise, pixels in cluster 720 in FIG. 7 are replaced by palette 820 from FIG. 8, and those pixels are labeled with the key "2" in FIG. 9. The clusters 730 to 780 are replaced by palettes 830 to 880, respectively, and those pixels are labeled with keys "3" through "8" in FIG. 9, respectively. Therefore, each pixel from the clusters in FIG. 7 and its corresponding palette in FIG. 8 is denoted with a number 1 through 8 in diagram 900 in FIG. 9. The numbers are arbitrary, and any number or letter or other designation could be used to denote the eight keys.

As seen in FIG. 9, the key numbers in the pixels that represent the corresponding palettes are often clustered around similar key numbers. That is, the top left of diagram 900 has a large number of pixels assigned to palettes 5 and 6. The bottom left of diagram 900 has a large number of pixels assigned to palette 8. The top right of diagram 900 has a large number of pixels assigned to palette 3. Diagram 900 shows how the pixels assigned to the different palettes are grouped spatially.

With diagram 900, a count of the transitions between pixels from one key to another key can be conducted. A transition from one pixel to another means that the pixels are touching one another along an edge or at a corner. For example, for the pixels assigned to key 5, many transitions occur to either another pixel with key 5, or to pixels with keys 3 and 6. Conversely, diagram 900 shows that there are not a lot of transitions between pixels with keys 5 and 2. A histogram is created that shows the frequency of occurrence of a given transition from one key to another key. That transition information is then used to determine how to smooth out the clustering from one cluster to another.

For example, a process is performed that counts every transition from one pixel to another in the block of 256 pixels shown in diagram 900. For example, the process begins at the top left corner of diagram 900 with pixel 902. Pixel 902 has a key of 5, and touches three other pixels (904, 906, and 908). The arrows in diagram 900 show the transitions that are counted. Pixel 902 has two transitions to pixels with a key of 5 (pixels 904 and 906) and 1 transition to a pixel with a key of 6 (pixel 908). The transitions to pixels with the same key do not have to be counted in this process. Therefore, the transitions from key 5 to key 5 can be ignored, and the transition from key 5 to key 6 is incremented by 1.

Next, pixel 904 is analyzed. Pixel 904 has two transitions to key 5 (pixels 910 and 906), and two transitions to key 6 (pixels 908 and 912). The transitions to key 5 are ignored, and the transitions from key 5 to key 6 is incremented by 2 (for a total of 3 transitions between keys 5 and 6). In this example, this process continues in order from left to right along the top row of pixels, and the moves to the second row of pixels, and proceeds from left to right along that row. The process continues along each row, from top to bottom, moving through the rows one pixel at a time from left to right.

As another example of the continuing process, pixel 920 is analyzed. Pixel 920 has been assigned the key of 4. Pixel 920 has one transition to another key 4 (pixel 922), and two transitions to key 8 (pixels 924 and 926). The transitions to key 4 are ignored, and the transition count from key 4 to key 8 is incremented by 2. Note that the transitions from pixel 920 to the pixels in the row above pixel 920 are not counted, because these two transitions would have already been counted as the process counted the transitions for the two pixels above pixel 920. The process should not double count any of the transitions between pixels with different keys.

The process for counting transitions can proceed in any order. As one example, the process starts with pixel 902 and then counts the transitions for every pixel in the first row. Then, the process moves to the second row and counts the transitions for every pixel in the second row. The process proceeds systematically in this manner until all transitions have been counted. As noted above, if a transition between two pixels has been counted, it is not counted again as the process moves pixel by pixel through the diagram.

FIG. 10 is a histogram 1000 of the key transitions from each key to every other key according to an example. The key transitions in diagram 900 of FIG. 9 were counted using the process described above and the result is histogram 1000. The first column and the first row of histogram 1000 indicate the key number. The numbers in the histogram indicate the number of transitions between respective keys. The transitions between keys of the same number are not tracked, and are indicated as "n/a" in histogram 1000.

As noted above, the transition information is used to determine how to smooth out the clustering from one cluster to another. Histogram 1000 is used to determine a sorted list of key values. At this point, a list of eight palette entries have been created (see FIG. 8), but the palette entries are arbitrarily chosen without an order. With the next step in the PCC technique, an ordering is created based on RGB distance between palettes, or based on the frequency of occurrence of one palette being spatially close to another palette based on histogram 1000.

To determine the order of palettes, a sorting algorithm is applied to the palettes. In examples herein, any suitable sorting algorithm is useful, including a sorting algorithm that uses RGB distance and the information in histogram 1000. In one example sorting example described herein, the sorting algorithm first looks for a strong RGB bond between palettes. If no strong RGB bond is found, the sorting algorithm looks for a strong spatial bond as indicated by the numbers in histogram 1000. The sorted list begins with the dimmest palette entry and then proceeds from there to complete the sorted list.

First, the brightness of each palette is calculated and stored. Brightness, or luminance, can be determined using any suitable manner. One example for determining brightness of a palette is shown in equation (5).

$$\text{Brightness} = 5*R + 9*G + 2*B \qquad (5)$$

where R, G, and B are the RGB values of the location of the palette as shown in FIG. 8. The results of these brightness calculations are omitted here for simplicity, but in an example the dimmest palette is palette 820 (key 2).

Second, the distance between each palette is calculated and stored in an array. The distance between palettes can be calculated using the DIFF equation above, (equation (4)). If the distance between the palettes is smaller, the bond between the palettes is stronger. As seen in FIG. 8, some palettes are closer to one another than others. For example, palette 820 is close to palette 870, but palette 820 is far away from palette 880. The distance calculations between each palette are omitted here for simplicity. Based on the distance, the bond between palettes can be categorized as strong or not strong. For example, in an RGB space between 0 and 255, a distance of 16 or less indicates a strong bond between palettes. Other criteria for determining a strong bond is useful in other examples. The number of strong bonds that each palette has is calculated and stored.

Third, the ordering algorithm begins by using the key associated with the dimmest palette. As noted above, key 2 is the dimmest palette in this example. Fourth, the next closest palette to the starting palette (key 2) is determined. If the DIFF value of the next closest palette is less than a configurable threshold, that next closest palette is used as the next sorted entry. One example of a configurable threshold DIFF value may be 32. If the DIFF value of the next closest palette is more than the configurable threshold, the ordering moves to the next remaining key with the largest spatial connection to the starting key, based on the values in histogram 1000. For example, key 2 in histogram 1000 is the starting key. The remaining key with the largest number of spatial connections to key 2 is key 7, with 47 connections. Each of the other keys has fewer connections to key 2 than key 7 does. Therefore key 7 is the next key, after key 2, in the ordering algorithm.

Then, if the palette with the strongest spatial connection (key 7 in this example) has two or more strong bonds (as determined above), the next entry in the sorted list is the remaining key with the strongest spatial connection to key 7. In this example, the next strongest spatial connection to key 7 is key 3, with 67 connections to key 7. Therefore key 3 is the third key in the order.

The process continues by determining the next closest palette to key 3. If there are two or more strong bonds for key 3 in RGB space as determined above, the next entry in the list is the remaining key with the strongest spatial connection to key 3, as shown in histogram 1000. In this example, the next strongest spatial connection to key 3 is key 5, with 42 connections. Key 5 is therefore the next entry in the sorted list. The spatial connection numbers between keys are tracked as well, as those numbers are used later in the process.

Figures 11, 12:
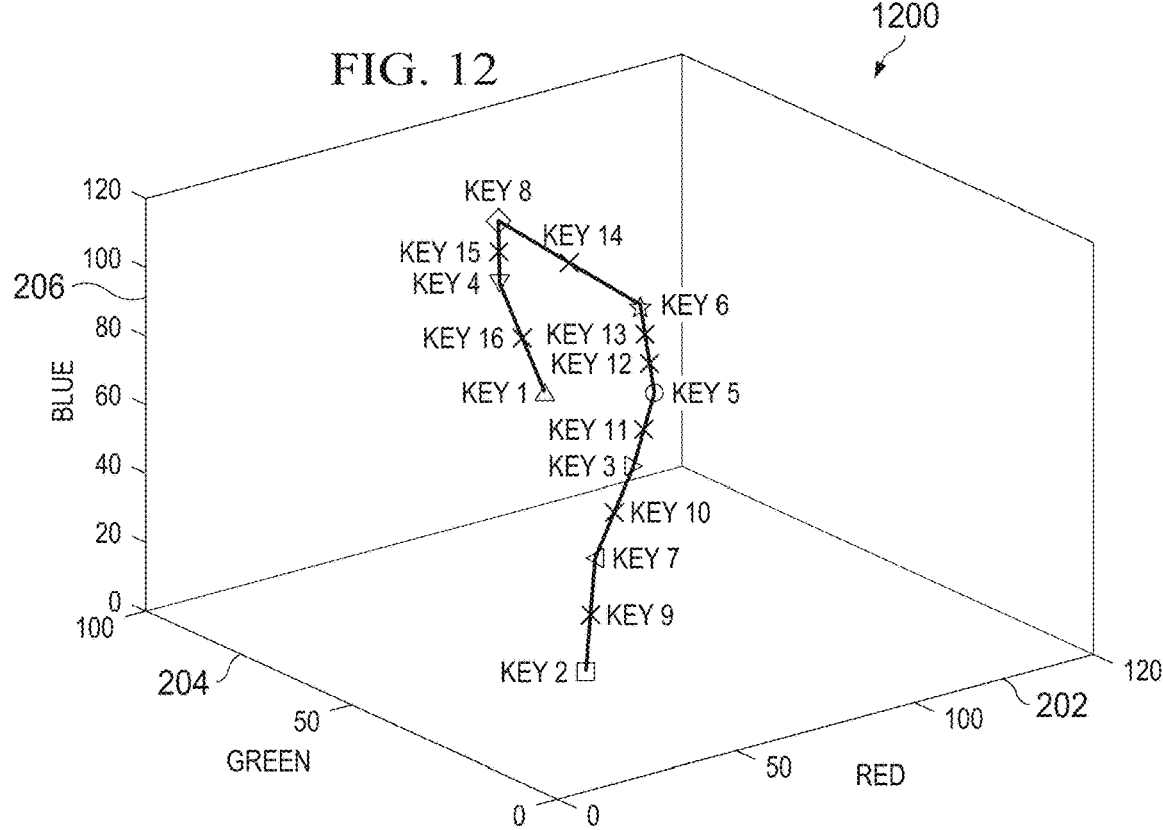
FIG. 11 is a histogram of key transitions in accordance with various examples.
FIG. 12 is a graph of keys in RGB space in accordance with various examples.

The process continues as described above until the entire list of eight keys has been sorted. FIG. 11 is a histogram 1100 with the connections used to sort the keys highlighted with a dashed box. Also, FIG. 11 provides an example of the final result of the ordered list and the spatial connection numbers between the keys. The final ordered list of the keys is 2, 7, 3, 5, 6, 8, 4, 1. The connection strength indicates the spatial connection numbers any two keys. The connection between keys 5 and 6 is the strongest at 85, while the connection between keys 6 and 8 is the weakest at 12.

The strong connection between keys 5 and 6 can be seen visually in FIG. 9. In FIG. 9, the top left and the bottom right of diagram 900 have a large number of pixels where keys 5 and 6 are next to one another, which produces the 85 spatial connections between these two keys.

FIG. 12 is a graph 1200 of the keys in RGB space according to an example. In graph 1200, lines have been drawn between the keys to connect Keys 1 to 8 in the order of the sorted list determined above with respect to FIG. 11. The line begins at Key 2, and moves to Key 7, then Key 3, Key 5, Key 6, Key 8, Key 4, and Key 1.

As the data is decompressed, sixteen palettes will be used rather than eight. These eight additional palettes are labeled as Keys 9 through 16 in graph 1200. To create sixteen palettes from the original eight palettes, bilinear interpolation is performed on the sorted palette list. The original eight keys were sorted as described above so bilinear interpolation could be performed. By sorting the original eight keys, an intermediate palette can be created between each key in the sorted list.

With eight palettes, an image that is decompressed can exhibit some quantization if a pixel assigned to one palette is next to a pixel assigned to a different palette. By using 16 palettes rather than 8, the transitions from one pixel to the next can be made smoother and reduce quantization.

The areas where subtle gradation occur in an image are referred to as low entropy areas. Creating twice as many palettes allows for more subtle gradations in the image. The eight new palettes are marked with X's on graph 1200 and labeled keys 9 through 16. The locations of the eight new palettes are found by interpolating between keys 1 through 8 in the sorted list. One new palette is placed between each of keys 1 through 8 in the sorted list. However, there are only 7 spaces between keys 1 through 8. Therefore, to add an eighth new palette, the key transition between the original keys 1 through 8 that has the strongest spatial connection is selected to have two new keys between the original keys. As seen in FIG. 11, the connection strength numbers between keys in the ordered list is (47, 67, 42, 85, 12, 48, 37). The highest number is 85, which is the spatial connection between keys 5 and 6. Two new keys are therefore placed between keys 5 and 6 rather than one new key, as with the rest of the sorted list of keys.

The new keys 9 through 16 are shown in FIG. 12. Key 9 is between keys 2 and 7, key 10 is between keys 7 and 3, and so on. Two new keys are placed between keys 5 and 6, and these are labeled keys 12 and 13 in FIG. 12.

The new keys are placed in RGB space using bilinear interpolation between existing keys. The next step is to assign pixels to the new keys. Each original pixel in block 102 is analyzed to determine which of the 16 keys that pixel should be assigned to. For each pixel, the closest palette of the eight new interpolated palettes is found. The closest palette can be found using the DIFF equations as described above (equations (1) to (4)). Any other suitable method for determining distance is useful in other examples. After the closest of the eight new interpolated palettes is found, that distance is compared to the distance between the pixel and the palette it is currently assigned to. If the distance to the interpolated palette is less, the pixel is reassigned to the interpolated palette. If the distance to the interpolated palette is greater than the distance to the currently assigned palette, the pixel remains assigned to its current palette. Each pixel is analyzed in this manner and is either assigned to a new interpolated palette or remains assigned to the original palette the pixel was assigned to.

In one example, a mean square error calculated for an image compressed and decompressed using eight palettes is 38.98. The mean square error calculated for the same image compressed and decompressed using sixteen palettes is 27.39. Therefore, in some examples a reduction in error can be attained by using sixteen palettes rather than eight palettes.

One issue created by increasing the number of palettes from eight to sixteen is that for every pixel that has been compressed or reduced to a single palette, a key indicates which palette that pixel is assigned to. With eight palettes, that key has one of eight values (0 to 7), and the key is encoded with three bits. If the list of palettes is increased to 16 palettes, the keys have to increase from 3 bits to 4 bits (to encode the values 0 through 15). Therefore, the keys should be compressed as well, or else the storage used for the compressed data set would increase to store the larger keys. In some examples, key compression provides reduces the amount of storage used with little visible impact on the end result of the PCC technique.

Compression of the keys is accomplished by taking advantage of a property of the human visual system known as the Mach Band Effect. The human eye exaggerates contrast between edges, creating overshoot and undershoot so edges can be better perceived. This means that compression errors can be hidden along edges in an image. If a large percentage of the compression occurs at edges, it is not as perceivable as compression that occurs elsewhere in the image. Therefore, a dynamic approach is used: in high entropy areas (such as edges), a large dynamic range is useful but not high precision. In low entropy areas (such as shallow gradients), a smaller dynamic range is fine, but higher precision is useful. The precision that is lost in high entropy areas is masked by the human visual system because of the Mach Band Effect.

Figure 13:
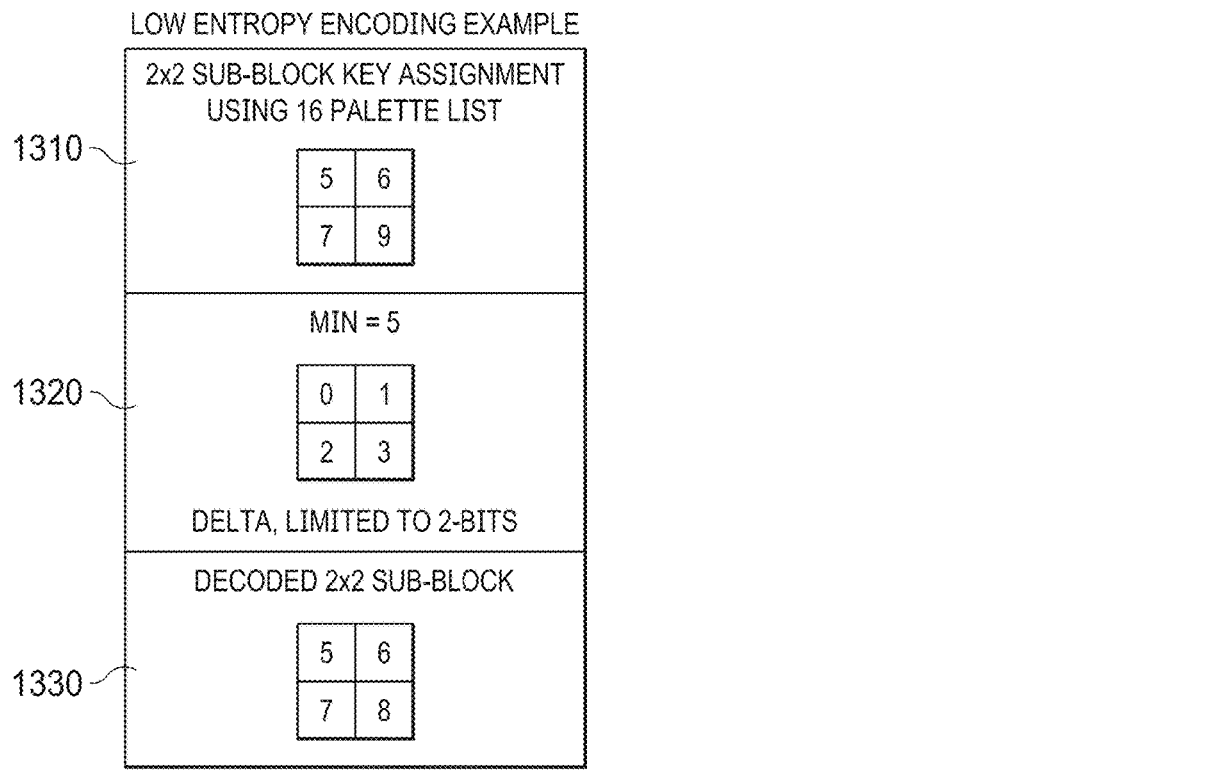
FIG. 13 is an example of low entropy encoding in accordance with various examples.

Compression of the keys is accomplished by using a technique that determines how to put a 2×2 sub-block of four pixels into one of two entropy encoding modes. In the first entropy encoding mode, a 2×2 sub-block is analyzed and then a minimum is determined within that sub-block. FIG. 13 is an example of low entropy encoding. In block 1310, an example 2×2 sub-block of keys from the 16-palette list contains keys 5, 6, 7, and 9. In block 1320, the minimum of the keys is found. In this example, the minimum is 5. The difference (delta) between the minimum and each key in the sub-block is calculated. The delta between the minimum (5) and each key is (0, 1, 2, 4). However, this delta is limited to 2 bits, so any difference greater than 3 is reduced to 3. After this reduction, the delta is (0, 1, 2, 3), as shown in block 1320.

As the sub-block is decoded, the delta for each key is added to the minimum (5). Therefore, (0, 1, 2, 3) are added to 5. After decoding, the resulting keys are (5, 6, 7, 8) as shown in block 1330. Because the original set of keys was (5, 6, 7, 9), one error was introduced in the last key using this type of encoding.

The second entropy encoding mode is high entropy encoding. For high entropy encoding, the original list of eight palettes is used rather than the list of sixteen interpolated palettes.

In an example, the amount of data used for storage is three bits per pixel. For each sub-block, a bit is used that indicates whether a high bit encoding or a low bit encoding produces the least error. On the encode side (the compression side), the minimum is calculated, along with the delta and the corresponding key value. Also, the error (if any) is calculated for each key value. In the example in FIG. 13, one key value was supposed to be 9, but an 8 resulted for that key value. That difference (e.g., 9−8=1) is the error that is associated with that instance of low entropy encoding.

For high entropy encoding, the closest palette in the original eight palette list is used and then the error associated with that palette list is determined. Whichever encoding produces the smallest error is used. A 1-bit control value gets set for a 2×2 sub-block, which denotes whether high entropy encoding or low entropy encoding was used for that 2×2 sub-block.

Figure 14:
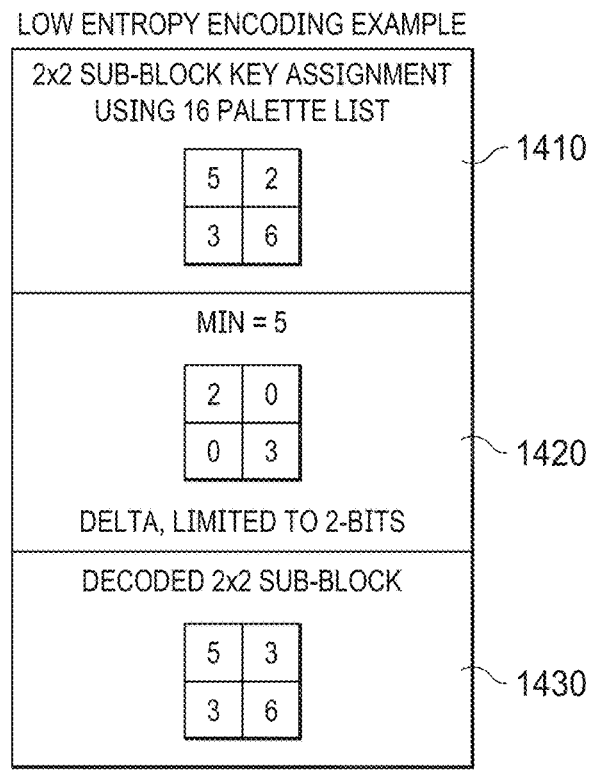
FIG. 14 is an example of low entropy encoding in accordance with various examples.

FIG. 14 is another example of low entropy encoding according to an example. FIG. 14 uses a key floor calculation to determine a floor that produces the largest bounded set contained by a delta of 0 to 3. In an example, block 1410 is a 2×2 sub-block of key assignments using the 16-palette list (e.g., 0 to 15). The four keys are (5, 2, 3, 6). First, the four keys are sorted in ascending order, which results in (2, 3, 5, 6). Then a floor is determined that produces the largest bounded set contained by a delta of 0 to 3. In this example, if a floor of 3 is chosen, the blocks below 3 are set to 3, and the other blocks remain the same. This results in (3, 3, 5, 6). Then, the difference (delta) between those numbers and the floor is calculated. Those differences are (0, 0, 2, 3). The delta is limited to 2 bits (0 to 3) as described above. Block 1420 shows the 2×2 sub-block after the delta between the keys and the key floor is determined.

Block 1430 is the decoded 2×2 sub-block. After decoding, the keys in the sub-block are (5, 3, 3, 6). As noted above, the original 2×2 sub-block contained keys (5, 2, 3, 6). An error was introduced for the second key in this example of low entropy encoding. In examples herein, either method of low entropy encoding (FIG. 13 or FIG. 14) can be used. In other examples, any other suitable method of low entropy encoding can be used.

Figure 15:
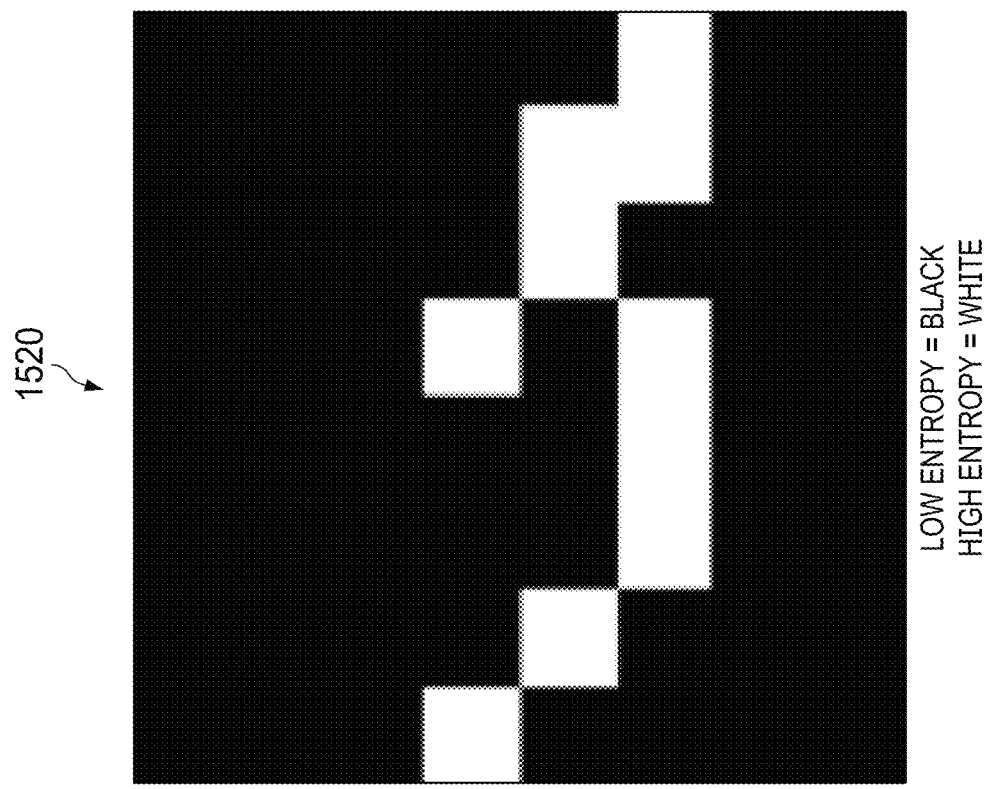
FIG. 15 is an image of areas of low entropy encoding and high entropy encoding in accordance with various examples.
Figure 15:
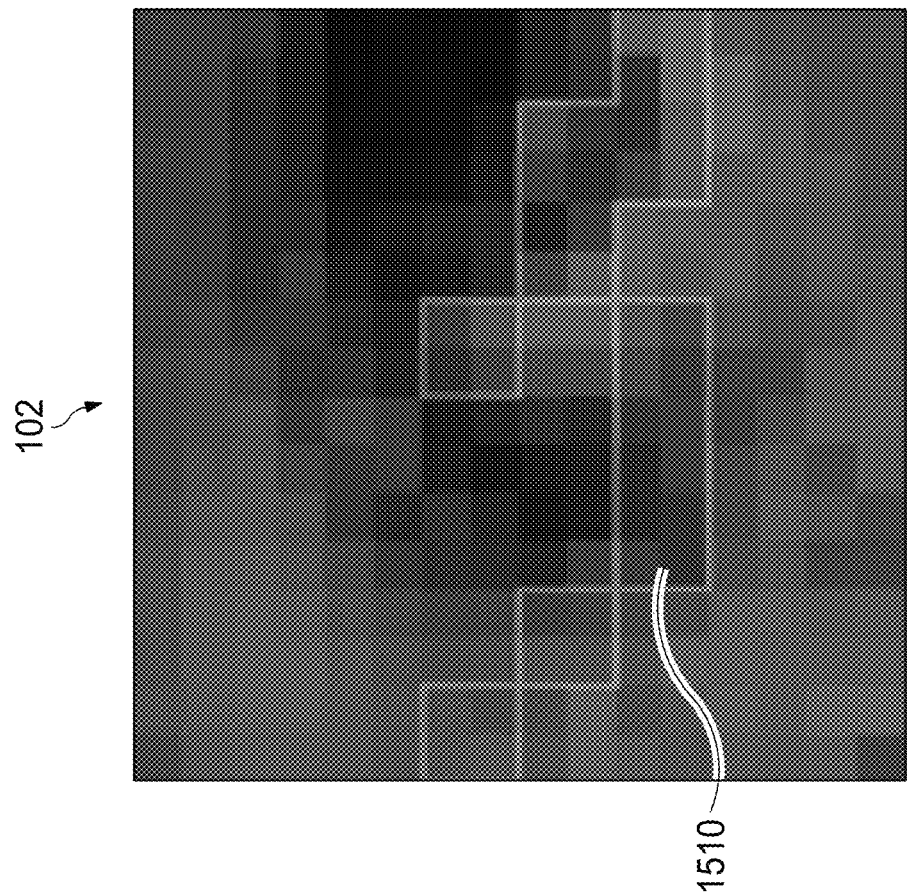

FIG. 15 is an image of areas of low entropy encoding and high entropy encoding according to an example. On the left side of FIG. 15 is block 102. Block 102 is the 16×16 block of pixels from FIG. 1 used to demonstrate the PCC technique herein. In block 102 in FIG. 15, certain areas of the image are highlighted. Around edges in images, high entropy encoding is often used to provide better compression results. The highlighted portion 1510 of block 102 shows areas of high entropy encoding. For other areas, low entropy encoding is used in some examples.

Image 1520 shows the areas of block 102 that are high entropy and low entropy using black and white regions. Black regions have the least error while using low entropy encoding, and white regions have the least error while using high entropy encoding. In one example herein, low entropy encoding is used in the black regions of image 1520 and high entropy encoding is used in the white regions of image 1520.

FIG. 16 is a block mitigation weighting algorithm 1600 in accordance with various examples. In some examples, a weighting algorithm is used to mitigate harsh discontinuities between blocks. As described above, PCC operates by dividing an image into blocks of pixels, such as the 16×16 block of pixels that form block 102. Each block that makes up an image is processed independently of other blocks. As the processed blocks of the image are reassembled into a single image, discontinuities may appear along the edges of the reassembled blocks of pixels. To mitigate this, a weighting is assigned to every pixel within a block. Weighting algorithm 1600 is one example of weighting for an 8×8 block of pixels. A weighting is assigned to each pixel within the 8×8 block. The numbers in weighting algorithm 1600 indicate how much weight each pixel is given. In this example, more weighting is assigned to the pixels on the edges than in the center of the 8×8 block. Assigning more weight to the pixels on the edges than in the center helps to reduce the discontinuities on the edges of the blocks of pixels. In an example, weightings can be determined experimentally to determine useful values for each weighting. Pixels along the edges are assigned weights of 15, 13, 11, or 10 in this example. During PCC processing, the contribution of these pixels to a cluster is multiplied by the assigned weight. For example, a weight of 15 means that pixel has a 15-fold impact to the corresponding cluster. Pixels in the center of weighting algorithm have an assigned weight of 1, and therefore have less impact than pixels at the edges. Algorithms different than weighting algorithm 1600 can be used in various examples. In some examples, a weighting algorithm is not used.

Storage requirements can vary based on the type of PCC compression implemented. With a light compression mode, the block size used by the PCC algorithm is 8×8. For the palettes, the storage requirement is eight palettes per color, times ten bits per color, times 3 colors per palette, which equals 240 bits. A 3-bit control is added for 243 bits. For the keys, 3 bits per pixel are used, with 64 pixels per block (192 bits). Sixteen 2×2 sub-blocks are used, with 1 control bit per sub-block (16 bits). Therefore 208 bits are used for keys. The bits per pixel are (243+208)/64 pixels, or 7.046875 bits per pixel.

With a heavy compression mode, the block size is 16×16. The palettes again use 243 bits. For the keys, the sub-block increases from 2×2 to 4×4. With that increase, 3 bits per pixel times 256 pixels per block is 768 bits. Added to that is 16 4×4 sub-blocks with 1 control bit per sub-block, for a total of 784 bits. The bits per pixel are (243+784)/256 pixels, or 4.0117 bits per pixel.

In one example, the maximum total storage for heavy compression used to store an Ultra High Definition (UHD) 4K image is (3840×2160 pixels per frame)*(4.0117 bits/pixel)*(1.0625 frames for a rolling buffer)=35.35 Mbits.

In one example, light compression mode produced a resulting peak signal to noise ratio (PSNR) between an original image and a compressed image of 41.9556 dB (decibels), using approximately 7 bits per pixel. A higher PSNR means a better quality for the compressed image. In another example, a heavy compression mode produced a PSNR of 38.4067 dB between the same original image and the compressed image, using approximately 4 bits per pixel. A PSNR in the high 30s to low 40s generally provides high quality results.

FIG. 17 is a flowchart of an example method 1700 for parent-child cluster compression in accordance with various examples. Although the method steps are described in conjunction with FIGS. 1-16, any system configured to perform the method steps, in any suitable order, falls within the scope of this description. In one example, a processor or controller performs the steps of method 1700.

Method 1700 begins at step 1710, where a processor obtains an image. The image can be any image for which PCC compression is performed. The image can be a color image of any suitable size.

Method 1700 continues at step 1720, where a processor or controller assigns a pixel of the image to a parent cluster of pixels based on a red-green-blue (RGB) location of the pixel. In one example, the processor or controller assigns the pixels to clusters as described above with respect to FIGS. 5-7. The processor or controller is also configured to determine a distance between a pixel and a centroid in RGB space, or the distance between pixels in RGB space.

Method 1700 continues at step 1730, where the processor or controller updates a centroid of the parent cluster based at least in part on the RGB location of the pixel. The processor or controller updates the centroids as described above with respect to FIGS. 5-6.

Method 1700 continues at step 1740, where the processor or controller splits the parent cluster into at least a first child cluster and a second child cluster. The processor or controller splits the cluster as described above with respect to FIG. 6. The processor or controller is also configured to determine DIFF values for various clusters and implement rules for splitting cluster using the DIFF values.

Method 1700 continues at step 1750, where the processor or controller assigns the pixel to the first child cluster. The pixel is assigned by the processor or controller as described above with respect to FIG. 6. The processor or controller is also configured to assign and/or reassign any pixel in an image according to the PCC process.

Method 1700 continues at step 1760, where the processor or controller updates a centroid of the first child cluster based at least in part on the RGB location of the pixel. Centroids of a cluster are updated by the processor or controller as described above with respect to FIGS. 5-6.

Method 1700 continues at step 1770, where a processor or controller replaces the pixel in the image with the centroid of the first child cluster. The processor or controller replaces the pixel as described above with respect to FIGS. 8-9.

Method 1700 continues at step 1780, where the processor instructs a display to display a compressed image, where the pixel in the image is replaced with the centroid of the first child cluster in the compressed image. As described above, each pixel in the image is replaced with a centroid of one of the clusters. Replacing the pixels with the centroids produces a compressed image. Any suitable type of display can be used to display the compressed image, such as a liquid crystal display (LCD), light emitting diode (LED) display, thin-film transistor (TFT), liquid crystal on silicon (LCoS), or any other display.

FIG. 18 is a schematic diagram of a system 1800 for performing PCC in accordance with various examples and as described above with reference to FIGS. 1-17. System 1800 includes processor 1802, memory 1804, and display 1808. Processor 1802 can be a central processing unit (CPU), a graphics processing unit (GPU), or a specialized processor or controller programmed to perform PCC. Processor 1802 can include any suitable architecture for performing PCC. Processor 1802 can include a processing pipeline, buffering, and control logic for performing PCC. Processor 1802 can include multiple processors, controllers, or engines to perform the examples described herein.

In an example, processor 1802 is configured to perform the method steps of method 1700 as described above. Processor 1802 is also configured to perform the steps of the PCC technique as described in FIGS. 1-16. In another example, processor 1802 is configured to assign each pixel in an image to one of a predetermined number of child clusters, where each child cluster includes a centroid, and where each centroid is associated with a palette of a first set of palettes. Processor 1802 is further configured to interpolate between the first set of palettes to create a second set of palettes.

Processor 1802 is also configured to assign each pixel in the image to a palette in either the first set of palettes or the second set of palettes. Processor 1802 is further configured to replace each pixel in the image with the palette to which each pixel is assigned.

Memory 1804 can include read-only-memory (ROM), random access memory (RAM), electrically erasable programmable read-only memory (EEPROM), flash memory, etc. Memory 1804 can store instructions 1806 for processor 1802 to perform PCC in accordance with examples herein. Memory 1804 is a non-transitory computer readable storage medium. Memory 1804 can also store image data, pixel data, and any other data used by processor 1802 to perform PCC as described above.

Memory 1804 is further configured to store a key for each pixel, where the key denotes the palette to which each pixel is assigned. In an example, memory 1804 is configured to store a control bit for a sub-block of pixels, where the control bit indicates a type of encoding for the sub-block.

Display 1808 includes any suitable type of display, such as an LCD, LED display, TFT display, LCoS display, or any other display.

In an example, PCC uses buffering and logic with a pipelined data path architecture to process the examples herein. When processing a block of pixels, calculations on one pixel generally finish before calculations on another pixel begins. Therefore, a straightforward pipelined data path architecture can have difficulties performing PCC, as no two pieces of data from the same block are in the pipeline simultaneously. However, data from different blocks can be in the pipeline simultaneously. By adding buffering and logic around the pipeline, the processing of multiple blocks can be interleaved using the same pipeline logic.

Interleaving all blocks in a single pipeline can present some limitations, as the single pipeline becomes a bandwidth bottleneck. Duplicating the pipeline increases bandwidth, but at the cost of logic area. In an example, the processing, buffering, and control logic are bundled into a PCC engine. A processing system can include multiple engines. The number of engines and interleaving factor can be varied to ensure that an available PCC bandwidth is in line with the PCC bandwidth used by the PCC tasks being performed. In one example, eight PCC engines could be used, with each PCC engine interleaving 32 blocks.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

Circuits described herein are reconfigurable to include the replaced components to provide functionality at least partially similar to functionality available prior to the component replacement. Unless otherwise stated, "about,"

"approximately," or "substantially" preceding a value means +/−10 percent of the stated value.

Modifications are possible in the described examples, and other examples are possible, within the scope of the claims.

What is claimed is:

1. A method, comprising:
obtaining an image by at least one processor;
assigning, by the at least one processor, a pixel of the image to a parent cluster of pixels based on a red-green-blue (RGB) location of the pixel;
updating, by the at least one processor, a centroid of the parent cluster based at least in part on the RGB location of the pixel;
splitting, by the at least one processor, the parent cluster into at least a first child cluster and a second child cluster;
assigning, by the at least one processor, the pixel to the first child cluster;
updating, by the at least one processor, a centroid of the first child cluster based at least in part on the RGB location of the pixel;
replacing, by the at least one processor, the pixel in the image with the centroid of the first child cluster to produce a compressed image; and
storing, in a memory by the at least one processor, the compressed image.

2. The method of claim 1, wherein a location of the centroid of the parent cluster is a location of a brightest pixel in the image.

3. The method of claim 1, wherein a location of the centroid of the parent cluster is a location of a dimmest pixel in the image.

4. The method of claim 1, wherein a location of the centroid of the parent cluster is a location of a mean of the pixels of the image.

5. The method of claim 1, wherein the parent cluster is a first parent cluster, and an RGB space includes a second parent cluster and a third parent cluster.

6. The method of claim 5, further comprising splitting each of the second parent cluster and the third parent cluster into two child clusters.

7. The method of claim 6, further comprising splitting one or more child clusters into additional child clusters until a predetermined number of clusters is reached.

8. The method of claim 7, further comprising:
assigning the pixels in the image to one of the predetermined number of clusters; and
replacing pixels in the image with a keys corresponding to respective clusters.

9. The method of claim 1, wherein assigning the pixel to the parent cluster based on the location of the pixel in RGB space further comprises assigning the pixel based on a distance between the pixel and the centroid of the parent cluster.

10. The method of claim 1, wherein splitting the parent cluster further comprises splitting the parent cluster based at least in part on compactness of the parent cluster of pixels.

11. The method of claim 1, further comprising assigning the pixel to the first child cluster based on a distance in RGB space between the pixel and the centroid of the first child cluster.

12. The method of claim 1, wherein the pixel is a first pixel, and the method further comprises:
assigning a second pixel of the image to the second child cluster;
updating a centroid of the second child cluster based at least in part on a location of the second pixel in RGB space; and
replacing the second pixel in the image with the centroid of the second child cluster.

13. A system, comprising:
a memory configured to store first keys representing pixels of an image;
a display; and
a processor coupled to the memory and to the display, the processor configured to:
retrieve, from the memory, the first keys;
produce a histograms of frequencies of key transitions of the first keys;
sort the first keys to produce sorted keys based on the histograms;
interpolate between the sorted keys to produce second keys;
map the pixels of the image to corresponding keys of the first keys or the second keys to produce a display image; and
instruct the display to display the display image.

14. The system of claim 13, wherein the processor is further configured to:
compress input keys using low entropy encoding to produce the first keys; and
store the first keys in the memory.

15. The system of claim 13, wherein the processor is further configured to:
retrieve, from the memory, a control bit for a sub-block of pixels, wherein the control bit indicates a type of encoding for the sub-block of pixels.

16. The system of claim 13, wherein the processor is further configured to:
assign the pixels in the image to a respective child cluster based at least in part on a location of each pixel in red-green-blue (RGB) space, the first keys corresponding to the respective child clusters; and
store the first keys in the memory.

17. The system of claim 13, wherein the processor is further configured to weight each pixel in the image based on a location of the pixel in the image.

18. The system of claim 13, wherein the processor is further configured to:
determine a strength of a bond between the first keys; and
sort the first keys based at least in part on the strength of the bond.

19. A system, comprising:
a memory; and
a processor coupled to the memory, the processor configured to:
assign a pixel of pixels of an image to a cluster based on a red-green-blue (RGB) location of the pixel and a centroid of the cluster;
update the centroid of the cluster to produce an updated centroid assigning the pixel to the cluster, based at least in part on a weighted average of the RGB location of the pixel and an RGB location of the centroid;
replace the pixels in the image with corresponding RGB values of corresponding centroids of the cluster to which the pixels are assigned, to produce a compressed image; and
store the compressed image in the memory.

20. The system of claim 19, further comprising a display coupled to the processor, the processor configured to:

retrieve the compressed image from the memory to produce a display image; and instruct the display to display the display image.

\* \* \* \* \*